US005963670A

United States Patent [19]
Lipson et al.

[11] Patent Number: 5,963,670
[45] Date of Patent: Oct. 5, 1999

[54] METHOD AND APPARATUS FOR CLASSIFYING AND IDENTIFYING IMAGES

[75] Inventors: Pamela R. Lipson, Cambridge; W. Eric L. Grimson, Lexington; Pawan Sinha, Cambridge; Tomaso Poggio, Wellesley, all of Mass.

[73] Assignee: Massachusetts Institute of Technology, Cambridge, Mass.

[21] Appl. No.: 08/600,378

[22] Filed: Feb. 12, 1996

[51] Int. Cl.[6] .................................................. G06K 9/62
[52] U.S. Cl. ............................................................ 382/224
[58] Field of Search .................................. 382/176, 180, 382/199, 305, 306, 224

[56] References Cited

U.S. PATENT DOCUMENTS

| | | | |
|---|---|---|---|
| 4,633,506 | 12/1986 | Kato | 382/56 |
| 4,742,558 | 5/1988 | Ishibashi et al. | 382/56 |
| 5,157,743 | 10/1992 | Maeda et al. | 382/56 |
| 5,164,992 | 11/1992 | Turk et al. | 382/2 |
| 5,384,868 | 1/1995 | Maeda et al. | 382/56 |
| 5,390,259 | 2/1995 | Withgott et al. | 382/9 |
| 5,404,435 | 4/1995 | Rosenbaum | 395/147 |
| 5,440,401 | 8/1995 | Parulski et al. | 358/342 |

OTHER PUBLICATIONS

"A content–based indexing technique using relative geometry features", Hou et al., published in SPIE vol. 1662, 1992, pp. 59–68.

"A hierarchical approach to feature indexing", by Grosky et al., published in SPIE vol. 1662 Image Storage and Retrieval Systems 1992, pp. 9–20.

"A Scheme for Visual Feature based Image Indexing", by Zhang et al., published in SPIE vol. 2420, pp. 36–46.

"A 2–D String Matching Algorithm for Conceptual Pictorial Queries", by Chang et al., published in SPIE vol. 1662 Image Storage and Retrieval Systems (1992), pp. 47–58.

"Adaptive Filtering and Indexing for Image Databases", by Alexandrov et al., published in SPIE vol. 2420, pp. 12–23.

"Automatic Indexing and Content–Based Retrieval of Captioned Images", by Srihari, published in IEEE, 1995, pp. 49–56.

"Automatic and Semi–Automatic Methods for Image Annotation and Retrieval In QBIC", by Ashley et al., published in SPIE vol. 2420, pp. 24–35.

"Chabot: Retrieval from a Relational Database of Images", by Ogle et al., published in Computer, pp. 40–48.

"Comparison of Subband Features for Automatic Indexing of Scientific Image Databases", by Perez–Lopez et al., published in SPIE vol. 2185, pp. 84–94.

"Complex Queries for a Query–By–Content Image Database", by Lee et al., published in Computer Science, Nov. 21, 1994, pp. 1–22.

"Content–Based Image Retrieval Systems", by Gudivada et al., published in IEEE, 1995, pp. 18–21, last page unnumbered.

"Efficient Color Histogram indexing for Quadratic Form Distance Functions", Hafner et al., published in IEEE, Transactions on Pattern Analysis and Machine INtellegence, vol. 17, No. 7, Jul. 1995, pp. 729–736.

"Evaluation of an application–independent image information system", by Oakley et al., published in SPIE vol. 2185, pp. 107–118.

(List continued on next page.)

*Primary Examiner*—Amelia Au
*Assistant Examiner*—Samir Ahmed
*Attorney, Agent, or Firm*—Christopher S. Daly; Nutter, McClennen & Fish, LLP

[57] ABSTRACT

An image processing system and methods of operation within such a system are disclosed. The image processing system utilizes a class model defined by one or more relative relationships between a plurality of image patches. The relative relationships describe the overall organization of images within an image class. The relative relationships are encoded in a global deformable template which can be used to classify or detect images. The class model may be predefined or generated by an image processing system.

23 Claims, 21 Drawing Sheets

OTHER PUBLICATIONS

"Feature extraction from faces using deformable templates", by Yuille et al., published in IEEE, 1989, pp. 104–109, including a last page not numbered.

"Feature Identification As An Aid to Content–based Image Retrieval", by Ramesh et al., published in SPIE vol. 2420, pp. 2–11.

"Flexible Montage Retrieval for Image Data", by Sakamoto et al., published in SPIE vol. 2185, pp. 25–33.

"Image Retrieval based on Multidimensional Feature Properties", by Ang, et al., published in SPIE vol. 2420, pp. 47–57.

"Image retrieval using Image Context Vectors: first results", by Gallant et al., published in SPIE vol. 2420, pp. 82–94.

"Image Searching in a Shipping Product", by Will Equitz, published in SPIE vol. 2420, pp. 186–196.

"0–Index of Imagebase", by Ying Liu, published in SPIE vol. 2420, pp. 68–81.

"Interactive Indexing into Image Databases", by Michael J. Swain, published in SPIE vol. 1908, pp. 95–103.

"Interpretation of Natural Scenes Using Multi–Parameter Default Models and Qualitative Constraints", by Hild et al., published in IEEE, 1993, pp. 497–501.

"Methodology for the representation, indexing and retrieval of images by content", by Petrakis et al., published in Image and Vision Computing vol. 11, No. 8, Oct. 1993, pp. 504–521, an a last page unnumbered.

"Modeling complex objects in content–based image retrieval", by Youssef Lahlou, published in SPIE vol. 2420, pp. 104–115.

"Photobook: Content–Based Manipulation of Image Databases", by Pentland, et al., published in SPIE vol. 2185, Feb. 6–10, 1994, pp. 1–24.

"Photobook: Tools for Content–Based Manipulation of Image Databases", Pentland et al., published in SPIE vol. 2185, pp. 34–47.

"Query by Image and Video Content: The QBIC System", by Flickner et al., published in IEEE, 1995, pp. 23–32.

"Query By Image Content and Its Applications", Ashley et al., published in Computer Science/Mathematics, Mar. 17, 1995, pp. 1–7 with first two pages unnumbered.

"Retrieval of Similar Pictures On Pictorial Databases", by Chang et al., published in Pattern Recognition, vol. 24, No. 7, 1991, pp. 675–680.

Query by image example: the CANDID approach, by Kelly et al., published in SPIE vol. 2420, pp. 238–248.

"Searching Images Using Ultimedia Manager", Treat et al., published in SPIE vol. 2420, pp. 204–213.

"Shape Analysis for Image Retrieval", by Domenico Tegolo, published in SPIE vol. 2185, pp. 59–69.

Shape Similarity–Based Retrieval in Image Database Systems, by Gary et al., published in SPIE vol. 1662 Image Storage and Retrieval Systems (1992) pp. 2–8.

"Similar–Shape Retrieval In Shape Data Management", Mehrotra et al., published in IEEE, Sep. 1995, pp. 57–62.

"Similarity of Color Images", by Stricker et al., published in SPIE vol. 2420, pp. 381–392.

"Similarity Measures for Image Databases", by Jain et al., published in SPIE vol. 2420, pp. 58–65.

"Similarity Searching in Large Image DataBases", by Petrakis et al., published in CS–TR–3388, Dec. 1994, pp. 1–33, with cover page unnumbered.

"Snakes: Active Contour Models", Kass et al., published in International Journal of Computer Vision, 1988, pp. 321–331 with last page unnumbered.

"The QBIC Project: Querying Images By Content Using Color, Texture, and Shape", by Niblack et al., published in SPIE vol. 1908, 1993, pp. 173–187.

"Visual image retrieval for applications in Art and Art History", by Holt et al., published in SPIE vol., 2185, pp. 70–81.

Individual pages each numbered 1, (total of 9 pages) by Virage, Inc., available on–line at http://www.virage.com/.

"Object Recognition via Image Invariants", by Pawan Sinha, available on–line at: http://www.aimit.edu/projects/cbcl/web–homepage/ewb–homepage.html.

"Perceiving and Recognizing Three–Dimensional Forms", Ph.D. Thesis, Chapter 7, Dept. of EECS, MIT, pp. 1–19, and FIGs. 1–18, Sep. 1995.

Transactions of the Institute of Electronics, Information and Communication Engineers of Japan, vol. E72, No. 6, Jun. 1989, pp. 771–781, XP000050590 Yamamoto et al: "Extraction of Object Features and Its ApplicationTo Image Retrieval".

Proceedings of the Region 10 Annual International Conference Tenco, Singapore, Aug. 22–26, 1994, vol. 1, Aug. 22, 1994, Chan T. K. Y, pp. 407–411, XP000529510, "An Image Database System With Fast Image Indexing Capability Based On Color Histograms".

Proceedings of the International Conference on Image Processing (ICIP), Washington, Oct. 23–26, 1995, vol. 1, Oct. 23, 1995, Institute of Electrical and Electronics Engineers, pp. 342–345, XP000624245, Lin H–C et al: "Color Image Retrieval Based on Hidden Markov Models".

Record of the Asilomar Conference on Signals, Systems and Computers, Pacific Grove, Oct. 30–Nov. 2, 1994, vol. vol. 2, No. Conf. 28, Oct. 30, 1994, Institute of Electrical and Electronics Engineers, pp. 1341–1345, XP000533864 Sclaroff S et al: "Search By Shape Examples: Modeling Nonrigid Deformation".

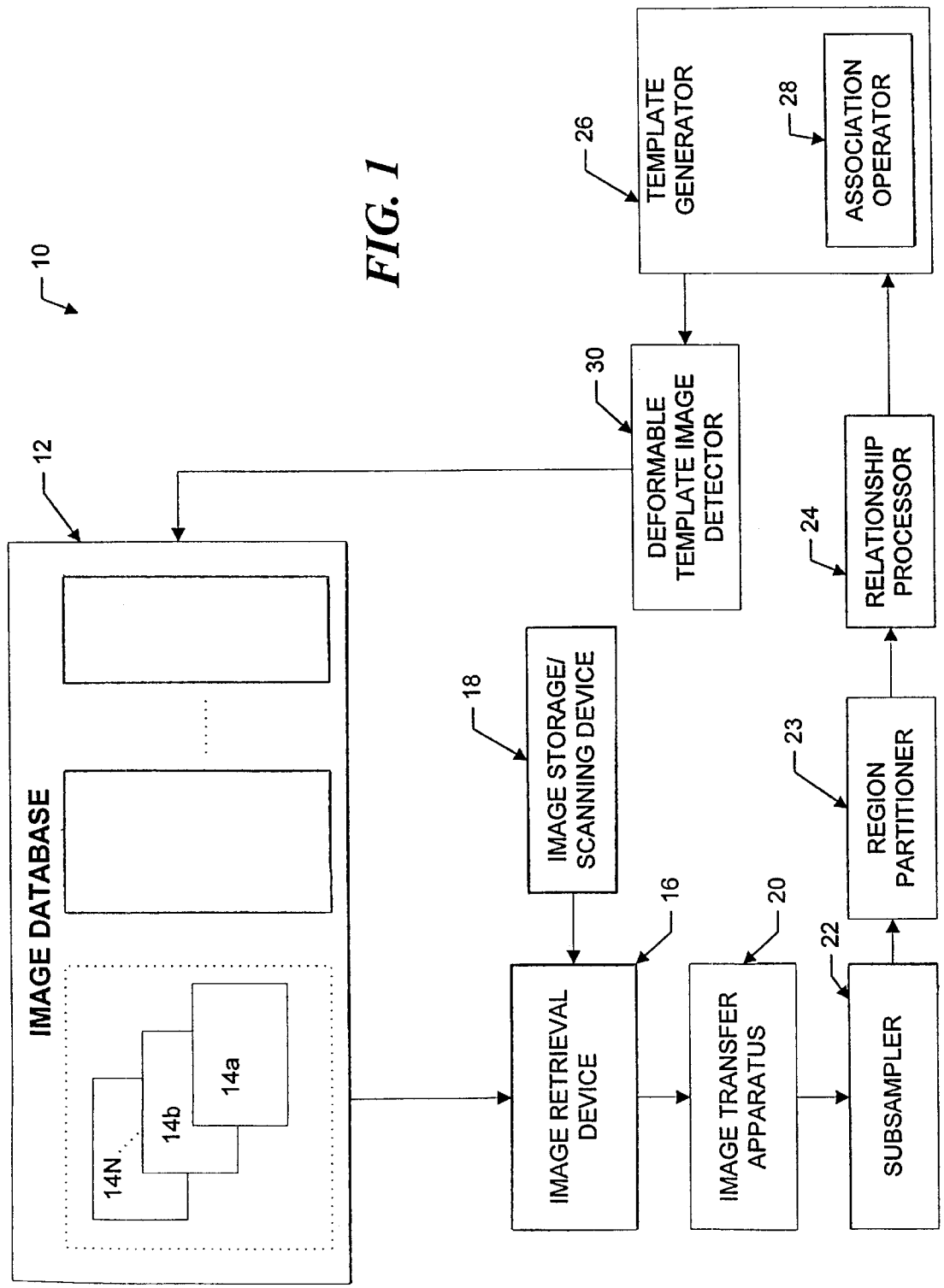

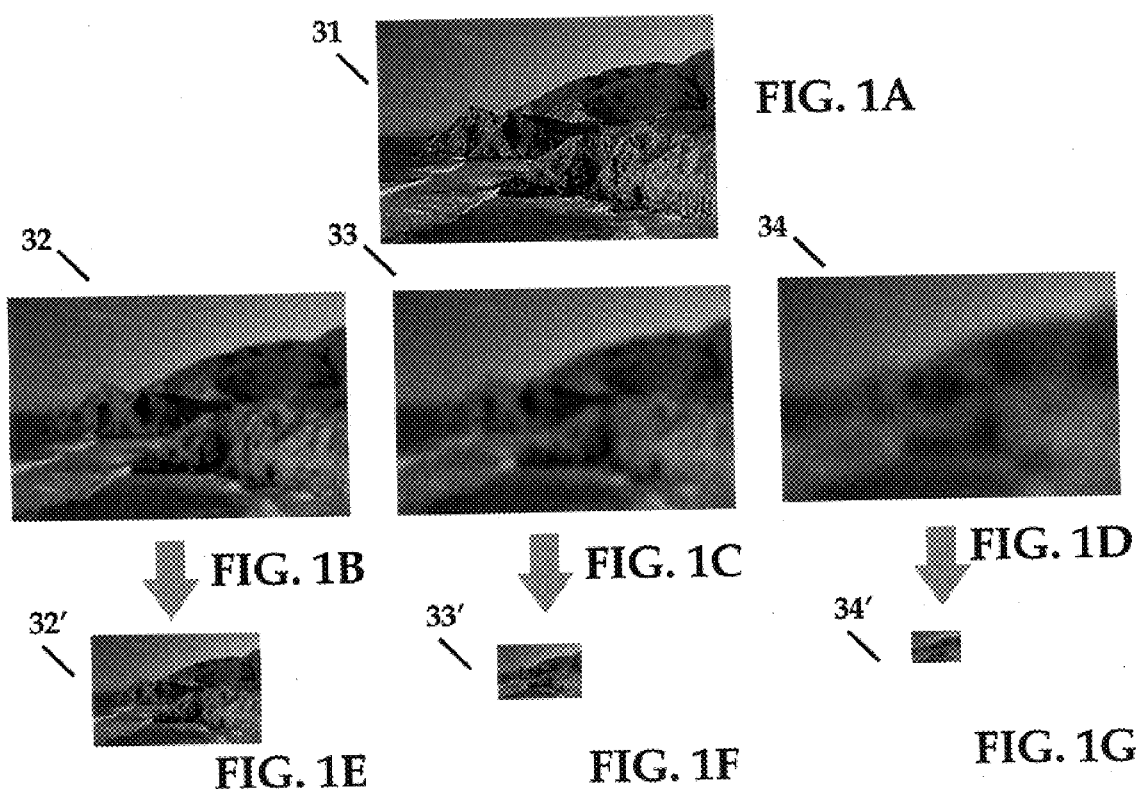

70b'

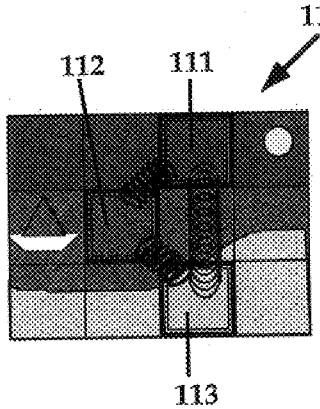 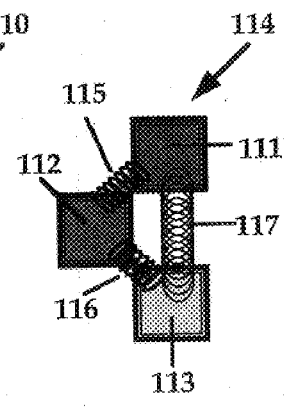 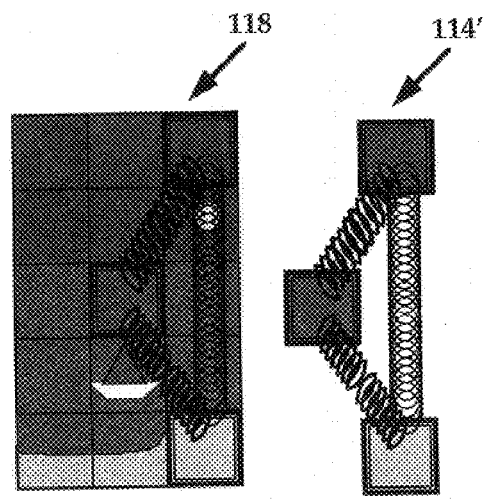
FIG. 6　　　FIG. 6A　　　FIG. 7　　　FIG. 7A

METHOD AND APPARATUS FOR CLASSIFYING AND IDENTIFYING IMAGES

GOVERNMENT RIGHTS

This invention was made with government support under grant numbers N00014-95-1-0600 and N00014-94-01-0994 awarded by the Department of the Navy. The government has certain rights in the invention.

FIELD OF THE INVENTION

This invention relates to image processing systems and more particularly to content based image classification and identification systems.

BACKGROUND OF THE INVENTION

As is known in the art, there has been a dramatic growth in the number and size of digital libraries of images. The National Geographic Society and the Louvre, for instance, have transferred much of their extensive collections to digital media. New images are being added to these digital databases at an ever increasing rate. As is known, a digital image is an image which may be represented as a two-dimensional array of pixels with each of the pixels represented by a digital word. With the increase in the number of available digital pictures, the need has arisen for more complete and efficient annotation (attaching identifying labels to images) and indexing (accessing specific images from the database) systems. Digital image/video database annotation and indexing services provide users, such as advertisers, news agencies and magazine publishers with the ability to browse through, via queries to the system, and retrieve images or video segments from such databases.

As is also known, a content based image retrieval system is an image retrieval system which classifies, detects and retrieves images from digital libraries based directly on the content of the image. Content based image processing systems may be used in a variety of applications including, but not limited to, art gallery and museum management, architectural image and design, interior design, remote sensing and management of earth resources, geographic information systems, scientific database management, weather forecasting, retailing, fabric and fashion design, trademark and copyright database management, law enforcement and criminal investigation and picture archiving and communication systems.

Conventional content based image/video retrieval systems utilize images or video frames which have been supplemented with text corresponding to explanatory notes or key words associated with the images. A user retrieves desired images from an image database, for example, by submitting textual queries to the system using one or a combination of these key words. One problem with such systems is that they rely on the restricted predefined textual annotations rather than on the content of the still or video images in the database.

Still other systems attempt to retrieve images based on a specified shape. For example, to find images of a fish, such systems would be provided with a specification of a shape of a fish. This specification would then be used to find images of a fish in the database. One problem with this approach, however, is that fish do not have a standard shape and thus the shape specification is limited to classifying or identifying fish having the same or a very similar shape.

Still other systems classify images or video frames based image statistics including color and texture. The difficulty with these systems is that for a given query image, even though the images returned may have the same color, textural, or other statistical properties as the example image, they might not be part of the same class as the query image. Such systems however are unable to encode global scene configurations. That is such systems are unable to encode the manner in which attributes such as color and luminance are spacially distributed over an image.

It would thus be desirable to provide a technique which may be used in a general automated scene classification and detection system and which allows the encoding of global context in the class model. These models may be subsequently used for image classification and retrieval from a database. It would be particularly desirable to have the system be capable of automatically learning such class models from a set of example images specified by a user.

SUMMARY OF THE INVENTION

In accordance with the present invention, an image processing system and method of operation within such a system are disclosed. The image processing system utilizes a class model defined by one or more relative relationships between a plurality of image patches. The relative relationships are encoded in a global deformable template. This template provides the information which describes the overall organization of images within an image class. The class model may be pre-defined or generated by an image processing system.

In one aspect of the present invention a method of generating a class model includes the steps of selecting a first image region from a plurality of image regions and identifying a first relative relationship between a property of a first one of the plurality of image regions, and a like property of a second one of the plurality of image regions. The first image and second image regions and the first relationship between them may be encoded in a deformable template by storing an elastic or flexible connection between the two regions. With this particular arrangement, a class model, which can be used to detect images of that class in a data base is provided. The class model may be stored in a storage device of an image processing system. The particular properties and relationships included in the model may be selected in accordance with a variety of factors including but not limited to the class of images to which the model is to be applied. For example, in one particular embodiment relating to classification of images of environmental or natural scenes, the relative relationships between the plurality of image patches correspond to relative spatial and photometric relationships. Consistent relationships between a plurality of like example images may be identified to provide a model defined by a plurality of image patches and a plurality of relative spatial and photometric relationships between the images patches. The model may be encoded in the form of a deformable template.

In accordance with a further aspect of the present invention, an image model for classifying or detecting images includes a plurality of image patches coupled by a plurality of relative image patch property relationships. The patch properties may correspond to properties including but not limited to one or more of spatial, color, photometric, texture, luminance and shape properties of the image patches. It should be noted that the image model is not a model of any particular object, rather it is a model which represents relative relationships, such as relative spatial and photometric relationships within an image. The model may be used in a configural recognition system. The configural recognition system utilizes the context or overall configuration of an image for identification and/or classification of an image. This differs from conventional approaches in which image understanding is based at least in part on recognizing individual salient image sub-parts. The configural recognition technique of the present invention utilizes image models which are provided from a global arrangement of sets of qualitative relationships (such as spatial and photometric relationships) between regions of an image. The image may be provided as a low resolution image. The image models are implemented as deformable templates having a plurality of image patches which are related by a plurality of relative relationships. With this configural recognition approach, the technique of the present invention can be used in a plurality of applications including but not limited to scene classification, face recognition and understanding of biological motion.

The configural recognition technique of the present invention proceeds without the need for complex abstractions past the image. The use of low resolution images derived from frequency images allows a reduction in the complexity of the problem and shifts the focus of the image away from potentially confusing image details provided by high frequency image data. Even though example images in a single image class may differ in absolute color and spatial arrangement, a class model, a scene concept which represents all of the images in a class is provided by using qualitative spatial and photometric relationships.

Finally, by encoding in a deformable template an overall structure of selected image regions and their relative relationships, the system is able to capture the global organization of the class. In the detection process only globally consistent solutions are considered, thus, reducing the amount of processing by the system and increasing its robustness.

In a still further aspect of the present invention, an image may be divided into a plurality of image regions and groups of image regions may be formed based on their attributes and relative relationships to other image regions. Image models may then be formed from properties of the groups of image regions.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

The foregoing features of this invention, as well as the invention itself, may be more fully understood from the following detailed description of the drawings in which:

FIG. 1 is a block diagram of an image classification and detection system;

FIGS. 1B–1G are a series of images having a different frequency content and having different resolutions;

FIGS. 6 and 6A illustrate a deformable model applied to an image of a beach scene;

FIGS. 7 and 7A illustrate a deformable model applied to an image of a beach scene;

DESCRIPTION OF THE PREFERRED EMBODIMENT

Terminology

Figure 2:
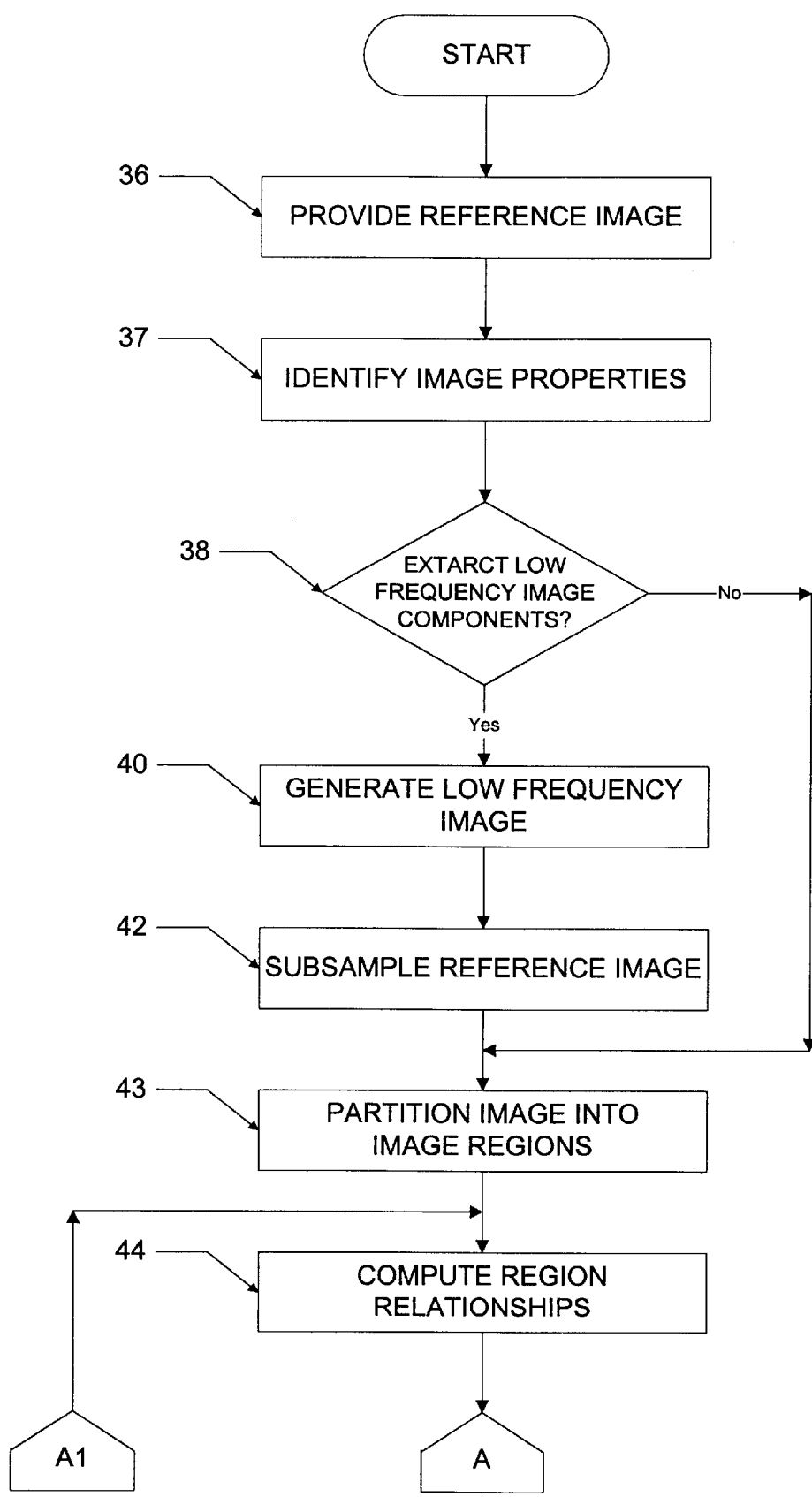
FIGS. 2–2B are a series of flow diagrams illustrating the steps of generating a class model.
Figure 2A:
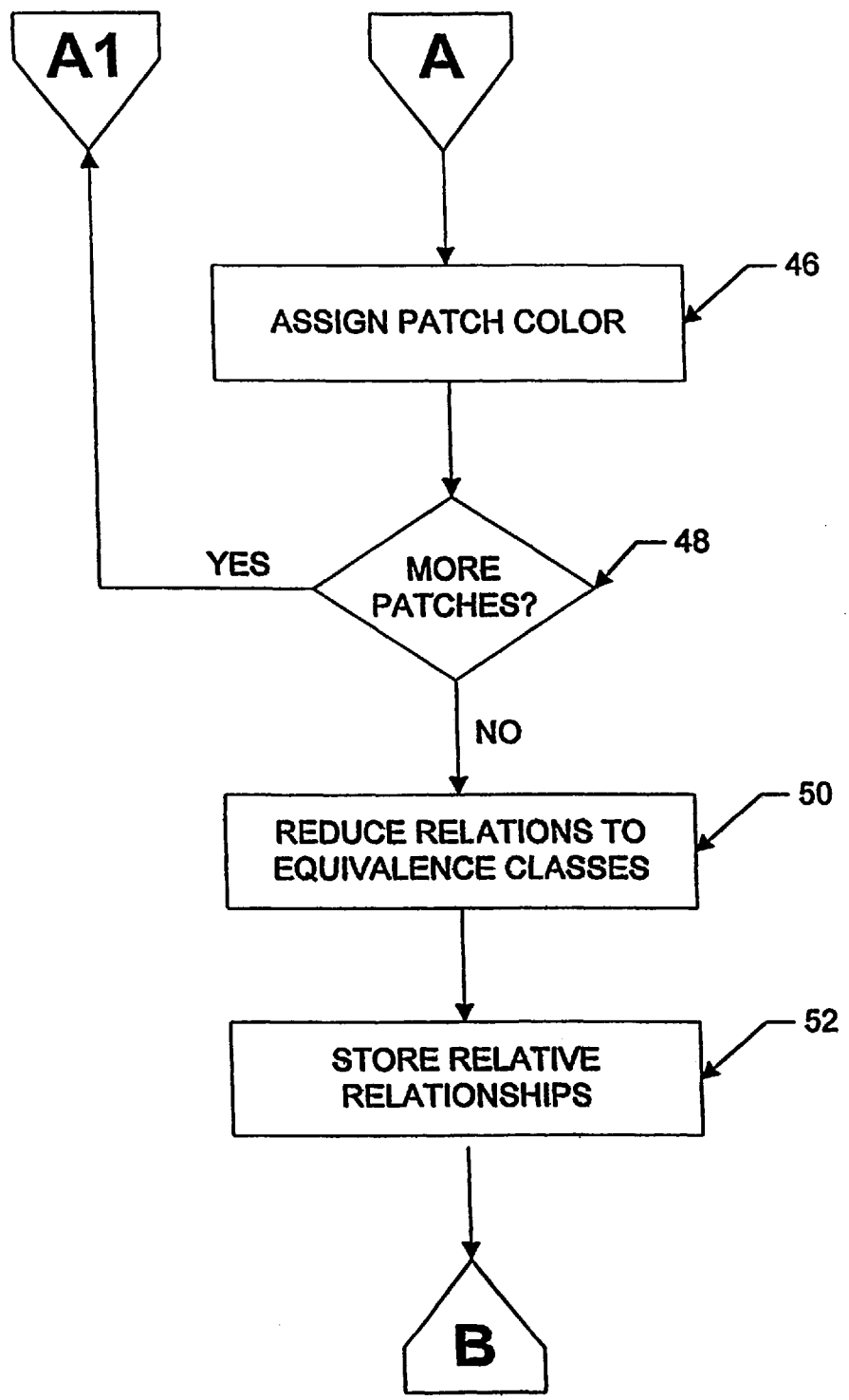

Before describing a configural classification/detection system and the operations performed to generate a class model, some introductory concepts and terminology are explained.

An analog or continuous parameter image such as a still photograph may be represented as a matrix of digital values and stored in a storage device of a computer or other digital processing device. Thus, as described herein, the matrix of digital data values are generally referred to as a "digital image" or more simply an "image" and may be stored in a digital data storage device, such as a memory for example, as an array of numbers representing the spatial distribution of energy at different wavelengths in a scene.

Similarly, an image sequence such as a view of a moving roller-coaster for example, may be converted to a digital video signal as is generally known. The digital video signal is provided from a sequence of discrete digital images or frames. Each frame may be represented as a matrix of digital data values which may be stored in a storage device of a computer or other digital processing device. Thus in the case of video signals, as described herein, a matrix of digital data values are generally referred to as an "image frame" or more simply an "image" or a "frame." Each of the images in the digital video signal may be stored in a digital data storage device, such as a memory for example, as an array of numbers representing the spatial distribution of energy at different wavelengths in a scene in a manner similar to the manner in which an image of a still photograph is stored.

Whether provided from a still photograph or a video sequence, each of the numbers in the array correspond to a digital word (e.g. an eight-bit binary value) typically referred to as a "picture element" or a "pixel" or as "image data." The image may be divided into a two dimensional array of pixels with each of the pixels represented by a digital word.

Reference is sometimes made herein to color images with only a luminance component. Such images are known as gray scale images. Thus, a pixel represents a single sample which is located at specific spatial coordinates in the image. It should be noted that the techniques described herein may be applied equally well to either grey scale images or color images.

In the case of a gray scale image, the value of each digital word corresponds to the intensity of the pixel and thus the image at that particular pixel location.

In the case of a color image, reference is sometimes made herein to each pixel being represented by a predetermined number of bits (e.g. eight bits) which represent the color red (R bits), a predetermined number of bits (e.g. eight bits) which represent the color green (G bits) and a predetermined number of bits (e.g. eight bits) which represent the color blue (B-bits) using the so-called RGB color scheme in which a color and luminance value for each pixel can be computed from the RGB values. Thus, in an eight bit color RGB representation, a pixel may be represented by a twenty-four bit digital word.

It is of course possible to use greater or fewer than eight bits for each of the RGB values. It is also possible to represent color pixels using other color schemes such as a hue, saturation, brightness (HSB) scheme or a cyan, magenta, yellow, black (CMYK) scheme. It should thus be noted that the techniques described herein are applicable to a plurality of color schemes including but not limited to the above mentioned RGB, HSB, CMYK schemes as well as the Luminosity and color axes a & b (Lab), YUV color difference color coordinate system, the Karhunen-Loeve color coordinate system, the retinal cone color coordinate system and the X, Y, Z scheme.

Reference is also sometimes made herein to an image as a two-dimensional pixel array. An example of an array size is size 512×512. One of ordinary skill in the art will of course recognize that the techniques described herein are applicable to various sizes and shapes of pixel arrays including irregularly shaped pixel arrays.

A scene is an image or a single representative frame of video in which the contents and the associated relationships within the image can be assigned a semantic meaning. A still image may be represented, for example, as a pixel array having 512 rows and 512 columns. An object is an identifiable entity in a scene in a still image or a moving or non-moving entity in a video image. For example, a scene may correspond to an entire image while a boat might correspond to an object in the scene. Thus, a scene typically includes many objects and image regions while an object corresponds to a single entity within a scene.

An image region or more simply a region is a portion of an image. For example, if an image is provided as a 32×32 pixel array, a region may correspond to a 4×4 portion of the 32×32 pixel array.

Referring now to FIG. 1, an image classification/detection system 10 includes an image database 12 having stored therein a plurality of images 14a–14N generally denoted 14. The images 14 may be provided as still images or alternatively the images may correspond to selected frames of a video signal which are treated as still images.

An image retrieval device 16 coupled to the image database 12 retrieves images from the database 12.

Alternatively, image retrieval device 16 may receive images from an image storage or image scanning device 18. Images retrieved by retrieval device 16 are fed to an image transform apparatus 20 which filters the image and provides a series of sub-images having high frequency or low frequency image components.

It is preferable to operate on images provided from low frequency image components since this reduces the amount of data which must be stored and operated upon by system 10 and more importantly, perhaps, the high frequency content of the full resolution image may be irrelevant for classification and may result in the presentation of image details to the system which may result in the system providing less than optimum classification and detection results. This is due, at least in part, to the fact that the relationships between sub-images of a full resolution image will in general not be similar between a number of images which are part of the same scene class. For example, two images of a group of trees taken from slightly different positions are likely to be quite similar in their low spatial frequency content but very different in their high resolution details because of the variations in the specific positions of the individual leaves and branches in the two images.

The low frequency images may be provided using a plurality of techniques including but not limited to spatial blurring techniques and wavelet decomposition techniques. Thus, considering the original image as a full resolution image, the full resolution image may be transformed into a plurality of images having different levels of image frequency content. These images may further be transformed to a plurality of images with different levels of spatial resolution.

Images having different levels of spatial resolution may be provided by feeding image components (e.g. low frequency image components) to a subsampler 22 which samples the image components using any technique well known to those of ordinary skill in the art.

Referring briefly to FIGS. 1A–1G an original image 31 has here been transformed via image transform apparatus 20 into a plurality of images 32 (FIG. 1B), 33 (FIG. 1C), 34 (FIG. 1D) each of the images 32–34 corresponding to original image 31 at different levels low frequency content.

Images 32–34 are generated from image 31 using a spatial blurring technique. For example, image 32 is generated using a spatial blurring technique with a guassian with a diameter of 3 pixels and fifty percent reduction in resolution to provide image 32'. Similarly, image 33 is generated from image 31 using a spatial blurring technique with a fixed pixel support guassian of 5 pixels and fifty percent reduction in resolution from image 32. Thus images 31, 32', 33', and 34' form a so-called image pyramid, a technique well known to those of ordinary skill in the art.

Each of the images 32–34 may then be sub-sampled via sub-sampler 22 to provide subsampled images 32' (FIG. 1E), 33' (FIG. 1F), 34' (FIG. 1G). Image 32 (FIG. 1B) includes relatively high frequency image components (e.g. a low pass filtered sequence) and thus includes some detailed image components. Image 33 (FIG. 1C) includes relatively low frequency image components (e.g. a lower pass filtered sequence) with a different frequency cut off than used to create image 32 and thus includes less detailed image components than 32. Image 34 (FIG. 1D) includes lower frequency image components than image 33 and thus includes even fewer image details than image 33.

It has been found that humans require a relatively small amount of detailed image information to recognize many objects and scenes. For example the so-called "Lincoln illusion" is a well known illustration of the ability of people to recognize objects using low frequency information. The only information retained in these small but identifiable images (i.e. 34') is an arrangement of low frequency photometric regions. Thus, in one aspect of the present invention, the classification technique utilizes only low frequency information. There are several benefits to using low-frequency subsampled images. The first is that the dimensionality of the problem is drastically reduced. The size of the images in FIG. 1G is roughly forty times smaller than original image 31. Thus, the dimensionality of the problem has been lowered by almost two orders of magnitude. Using the low-frequency image content also confers immunity to spurious relationships due to high-frequency sensor noise. In addition it changes the focus of the problem to relationships between image regions.

Referring again to FIG. 1, predetermined ones of the sub-sampled images are fed from subsampler 22 to a region partitioner 23. Region partitioner 23 partitions image 14 into one or more image regions also known as image patches, with each of the image regions having at least one pixel. It should be noted that the image regions need not be of equal size or shape. The image regions are provided to a relationship processor 24 which identifies relative relationships between those regions which make up the image.

For example, relationship processor 24 may identify relative photometric and spatial relationships between regions in an image or relationship processor 24 may identify relative color, luminance, texture, size, shape, geometrical properties such as relative region orientations and objects within an image. The particular set of relationships which are identified depend upon a variety of factors including but not limited to a particular class of images to be operated upon. For example, when classifying or detecting natural scenes, it may be desirable to select photometric properties of images (rather than texture for example). One important determinant of this choice is the nature of the attribute expected to be discriminatory between different image classes. If high frequency detail is considered a distinguishing factor, then the relationships extracted may use image texture. Thus, in this case, image transform apparatus 20 would provide high frequency image components rather than low frequency image components. The high frequency image components can be fed directly into region partitioner 23. On the other hand, if the discrimination ability is based on components of the images color, then relationships need to be extracted on the chromatic attributes of images.

An association operator 28 then associates the attributes (including the relative relationships) of each region in the image with at least one other region in the image. One manner in which the association may be provided is explained in detail below in conjunction with FIGS. 9–9C.

A template generator 26 identifies relative relationships which are consistent between a plurality of images fed to relationship processor 24. For example, if relative spatial and photometric properties are identified by relationship processor 24 in each of a plurality of different images, then template generator 26 would identify those relative spatial and photometric relationships which were consistent between each of the plurality of images.

Template generator 28 then encodes the consistent relational information as a deformable template. The deformable template may then be used by a image detector 30 to detect class concepts in images in the image database 12. Detector 30 may also use the deformable template to register or align regions of different images.

Detection refers to the process of finding a match, between a class template and a novel image. A novel image is an image not used as an example image to generate the template. A "match" occurs when a pairing of components of the template is made to elements of the image, and all or most of the relationships between elements of the template are also satisfied by the corresponding elements of the image. Registration means using the pairing of elements of the template to elements of the image to determine a flexible transformation that aligns the template to the image. A user may wish to find corresponding regions between images that fall in the same class. By detecting the scene concept in both images, detector 30 is able to provide a mapping of regions in the first image to regions in the second image.

By identifying image properties and expressing the properties as a plurality of relative relationships, the present invention performs image classification and identification based on a global organization of features and relationships in an image. Such a global organization within an image may be quantified in terms of a plurality of different image properties or characteristics including, but not limited to spatial and photometric (chromatic and luminance) image characteristics.

This is in contrast to prior art systems which recognize image scenes by specifically identifying individual objects within an image and then using the specific object information to classify an image. Still other prior art systems identify, for example, the global histograms of the color content and luminance content in an image and use this information to identify an image class in which the image belongs. Other techniques compute local statistics that characterize attributes such as color and texture without respect to how their global configurations contribute to the scene concept.

As will be described below in conjunction with FIGS. 2–2B, an image template may be automatically generated via a properly programmed general purpose computer or other processor. Alternatively, an image template may be provided by defining a plurality of relative relationships such as relative spatial and photometric relationships between template image portions or patches without the aid of a processor. An image template may even be generated without the aid of any particular image. That is, the patches which are used in an image template need not be derived from any particular image. The defined relative relationships between the image patches would be manually defined and stored in template generator 28. The image template would then be available for use by image detector 30 as described above.

The information used to specify the relative relationships within an image or a class of images may thus be supplied by a system external to classification and detection system 10. Alternatively, such information could be supplied to system 10 from a user who has studied one or more images or who has personal knowledge of relevant relative relationships for a given class of images. Such information may be supplied to system 10 through a user interface for example.

Thus, in one embodiment, the present invention uses photometric regions from the low-frequency pictures as the image and model primitives and three kinds of inter-region relationships. The inter-region relationships are relative color, relative luminance, and relative spatial position of the regions. One of the great difficulties for the automated interpretation of images is that scenes change their appearance under various lighting conditions, viewing positions, and other scene parameters. Thus, while absolute color, luminance, and spatial position of image regions cannot generally be used as reliable indicators of a scene's identify, their relative luminance, color and spatial positions remain largely constant over these various conditions and thus can usually be relied upon as reliable indicators of a scene's identity.

In one embodiment, a class model includes six specific types of relative spatial and photometric relationships. Specifically, the class model includes luminance, R,G,B, horizontal position and vertical position relationships. Each of these relationships can have the following values: less than, greater than, or equal to. The relative color between image regions is described in terms of their red, green, and blue components. The class model also includes relative luminance relationships. The spatial relationships used are relative horizontal and vertical descriptions, where the origin of the image is specified (i.e. upper left hand corner). It should be noted, however, that other relative relationships, such as relative hue and saturation, can also be incorporated into the system.

Descriptions of scene classes using qualitative relationships based on low frequency information provide a rich vocabulary to differentiate between many classes of images. For example, consider a class model provided from three pairwise color relationships (e.g. greener than, bluer than, redder than), one luminance relationship (e.g. darker/lighter than), and two pairwise spatial relationships (e.g. above/below, to the left/right of) with each of these relationships having two values. In an image of m pixels, there is an upper bound of m*(m−1)/2 possible pairwise relationships. Assuming that the spatial, photometric, and luminance relationships are independent, there are $(2^6)^{(m*(m-1)/2)))}$ possible object concepts One significant point to note is that not all relationships between all image regions are necessary to define a model or the concept of a scene or scene class. Rather, as will be described below in conjunction with FIG. 2. models can be developed that encode only the salient discriminatory relationships in an image.

Figure 2B:
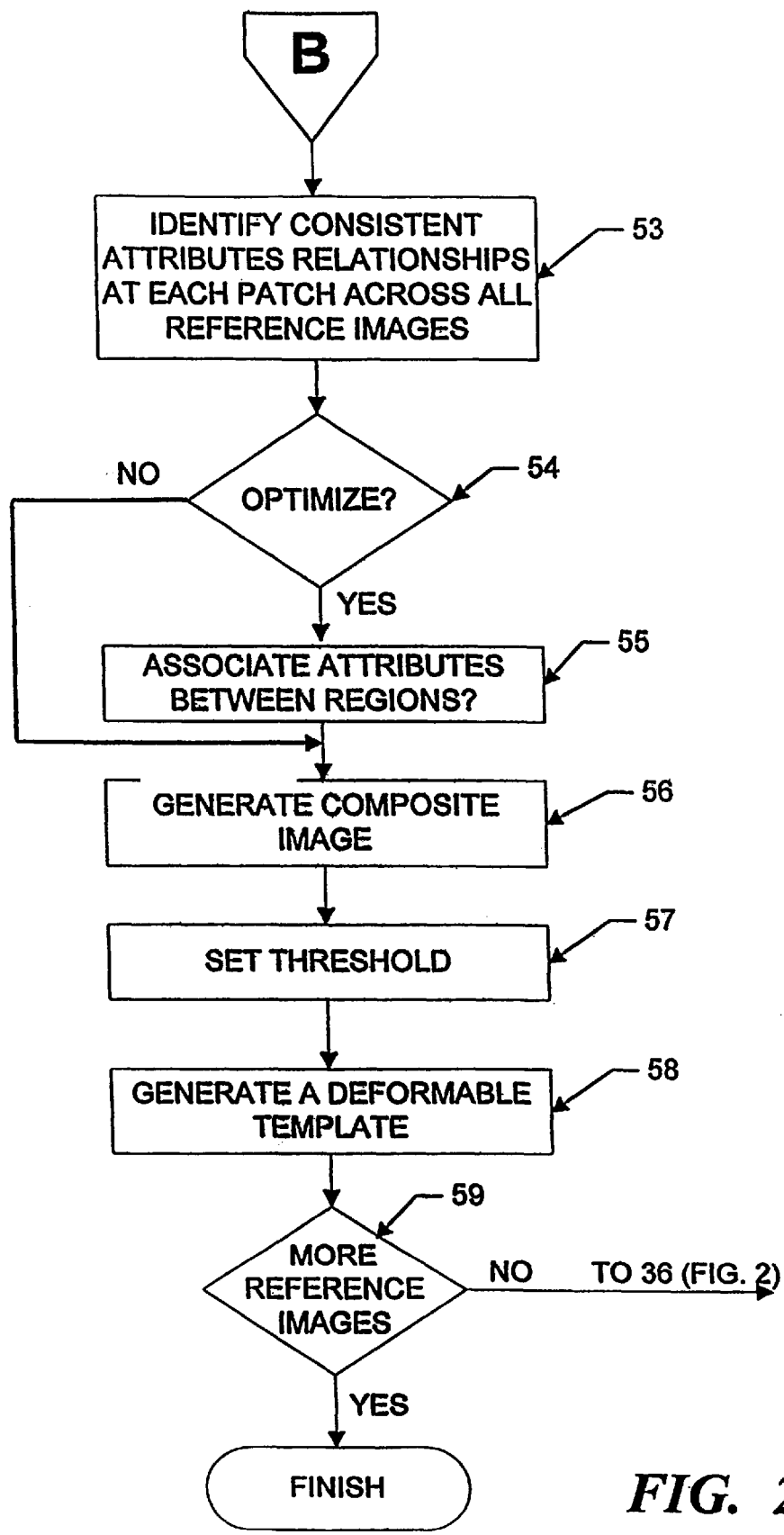

FIGS. 2–2B are a series of flow diagrams illustrating the processing performed by the apparatus to generate a class model. The rectangular elements (typified by element 36), herein denoted "processing blocks," represent computer software instructions or groups of instructions. The diamond shaped elements (typified by element 38), herein denoted "decision blocks," represent computer software instructions, or groups of instructions which affect the execution of the computer software instructions represented by the processing blocks. The flow diagram does not depict syntax of any particular programming language. Rather, the flow diagram illustrates the functional information one skilled in the art requires to generate computer software to perform the processing required of system 10. It should be noted that many routine program elements, such as initialization of loops and variables and the use of temporary variables are not shown.

Turning now to FIGS. 2–2B, a method of generating a class model begins by selecting a reference image as shown in step 36. The image is a member of a class of images and is used as an example reference image from which will be generated a class model. In some applications, it may be desirable to select multiple example reference images and to generate the class model from relative relationships which exist in the multiple images. Use of more than one example image will typically allow generation of a class model based on consistent relationships and which is flexible enough to aid in classification of a wide variety of images belonging to the same image class.

As used herein, the term "image class" or more simply "class" describes a set of logically related images which share the same or similar characteristics or properties. For example, images of beach scenes can be defined as all belonging to a beach scene image class. Similarly images of mountain scenes, images of field scenes, etc . . . may all be defined as belonging to different image classes e.g. a class of mountain images, a class of beach images, a class of field images, etc . . . . . It should be noted that it is possible for images to belong in more than one class. For example, an image of a mountain with a lake can belong to either the class of mountains with lakes or the class of lakes with trees. It should also be appreciated that a class can be defined in more than one way. That is, there may be more than one set of relationships for a given class of images which may be used to define a class model. By allowing images to belong to more than one class a relatively flexible image classification system is provided.

As shown in decision block 38 a decision is made as to whether low frequency image components should be extracted from the original image. In some instances the selected original image might have a level of detail which is appropriate for processing. In other cases the selected image may have a level of detail which is not optimum for processing. For example, the method of the present invention preferably is practiced with a low resolution and subsampled image which does not include a great amount of image detail. It should be noted, however, that the techniques to be described herein may also be applied to a highly detailed image. For instance, if were desirable to make comparisons between high frequency texture in different image regions, it would be desirable to operate on an image having high frequency components corresponding to detailed image information. For example high frequency texture information may allow discrimination between snowy mountains and in clouds in two different images.

However, in general, computing relationships between every pixel in a highly detailed large image is costly. Furthermore, the subsequent process of finding consistent relationships between a plurality of target images is also expensive in terms of the computer resources require to implement such a process.

Thus, If the image is provided at a level of detail which is appropriate for processing then processing flows directly to processing step 43 where the image is subdivided into regions. If, however, the image is provided at a level of detail which is not computationally efficient to operate on, then low frequency image components are extracted from the full resolution image and an image having low frequency image components is generated as shown in processing block 40. As noted above in conjunction with FIGS. 1–1G, the low frequency content image may be generated using a number of well-known techniques including but not limited to spatial blurring and wavelet decomposition techniques. Processing then proceeds to subsampling processing block 42 where a low resolution image is achieved.

After the images are subsampled, processing continues to step 43 where, as mentioned above, the image is partitioned into one or more image regions. Processing then continues to step 44 where relative relationships between image regions in the image are computed. Thus, if it is decided to use the relative photometric and spatial relationships in the image, then the relative photometric and spatial relationships between regions are computed. On the other hand, if the relative relationships correspond to one or more of image region texture, image region size, image region shape, image region geometrical properties, image region symmetry and object relationships within an image, then the relative relationships based on these image characteristics or image properties are computed.

In one embodiment, region relationships are computed between two regions (i.e. a region pair). It should be noted, however, that region relationships could be computed between region triples, region quadruples or between every region in the image. Use of region pairs, however, provides a system which is computationally efficient while still providing a sufficiently descriptive class model which can be used to classify a variety of different images within a single class.

If it is desired to encode particular features of the image region in the model, then processing proceeds to step 46. As shown in step 46, in the case where patch color is selected as at least one of the relative relationships to be included in the class model, patch colors may be determined for each of the regions. In addition to the relative relationships between regions, this provides a basis for grounding the relative photometric relationships. Specifically, an estimate of a color for each of the plurality of pixels is computed from a coarsely quantized color space. The benefit of this step is that some information of the region's color is retained. It should be noted, however, that the image model is not based on exact color since exact color may vary to some extent between corresponding regions in images of the same class. For instance, sky regions are usually blue, however they can be different shades of blue.

A color estimate may be generated, for example, if each pixel has an 8 bit red, 8 bit green, and 8 bit blue byte associated with it and each of the bytes are lumped into a coarser resolution than the 256 resolution afforded by the 8 bits. It may be desirable to use a coarser resolution since in the present invention precise color estimates are not always required, and, in fact, may in some instances they act detrimentally to the operation of template generation.

It should be noted that if color is not a feature to be included in the class model, then step 46 may be omitted. In some instances where color is a feature to be included in the class model, it may not be necessary or desirable to assign a coarsely quantized color to a pixel or image region. If other features such as texture or shape rather than or in addition to color of any image region are to be included in the model, the attribute can be computed in processing block 46.

Decision block 48 implements a loop in which steps 44–46 are repeated for each of the regions in the subsampled image.

Once relative region relationships and region colors have been estimated for each of the regions in the image, processing proceeds to processing step 50 where the region relationships are reduced to equivalence classes. As will be described in detail below in conjunction with FIG. 8, the use of equivalence classes is optional. It acts to reduce the number of region relationships which must be stored in memory by eliminating redundant region relationships and eliminating the need to store exact region positions in an image or an image region. Thus the use of equivalence classes leads to computational efficiency.

For example, an equivalence class can be provided as a directional equivalence class meaning that certain relationships apply in general directions relative to a particular pixel or group of pixels. It should be noted, however, that equivalence classes other than directional equivalence classes may also be used. For instance, all luminance relations where the first region is brighter than second first region belong to the same equivalence class irrespective of precisely how large the brightness difference is.

Next, as shown in step 52 the relative relationships are stored in a storage device such as a memory for example. Thus, in the case where the class model is provided from relative spatial and photometric relationships, the relative colors and relative spatial relationships of each of the patch pairs are stored in a storage device. When colors have been assigned to a patch, the colors or other attributes of the patch may also be stored. It should be noted that steps 36–52 can be performed by a preprocessor. Thus, in this case an image processor may be fed the relative spatial relationships of each of the patch pairs.

Figure 9:
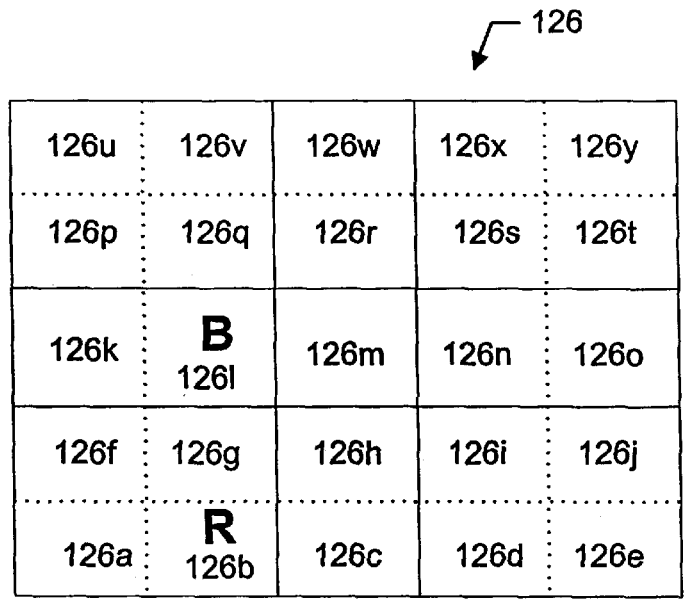
FIG. 9 is an image in which attributes of image regions are associated with other image regions.

Whether or not the relative relationships are preprocessed, the relative relationships between properties for each image in a set of reference images are further processed to identify consistent attributes and relationships between a number of images. As shown in processing block 53 consistent attributes and relative relationships at each patch are identified across all of the image examples provided to the system. FIGS. 9–9B describe how this identification of consistent relationships may be done in a computationally efficient manner.

In decision block 54 a decision is made as to whether an optimization procedure should be performed. If decision is made to optimize, then processing continues to processing block 55 where region attributes including relative region relationships (e.g. relative spatial and photometric relationships) are associated between neighboring regions. The association of region attributes will be described in detail below in conjunction with FIGS. 9–9B. It should be noted that it is not necessary to associate attributes between neighboring regions and in some cases this step may be omitted.

Whether or not an optimization is performed, after all of the consistent colors and relative relationships have been identified, a composite image is generated, as shown in step 56. The composite image is generated based on knowledge of the consistency across the reference images of every relative relationship between the regions in those reference images. Then as shown in processing block 57, a consistency threshold value can be set and used to generate a deformable template. It should be noted that if the consistency threshold is set at zero all relationships regardless of how consistent they are across the reference images are encoded in the scene mode, The composite image corresponds to a template. Alternatively, the consistency threshold can be set to find relationships with 100% consistency amongst all of the example images. The setting of the threshold between 0% consistency and 100% consistency allows the deformable template to encode several possible relationships between image regions. For instance, in the class of field scenes, the regions corresponding to grass are usually greener or browner than the image regions corresponding to the sky. Setting a threshold below 100% allows the model to capture these types of variations It should be noted that although these terms "class model" and "class template" and here being used interchangeably, generally a template is a specific version of a class model.

By storing all of the relative relationships across the reference images as well as the consistency of the relationships, the system can accentuate or de-accentuate certain relationships which may be important in a particular image class. The class model generated in step 58 may be used to detect new images in the same class from a database or other repository of images. The performance of the model may be evaluated by the images it detects. A user of the system may want to refine the model or accentuate or de-accentuate certain features of the model.

This can be done by providing the system with more example images as indicated in step 59 or it can be done by hand. For example, in step 58 a beach model may have been generated which describes both the sub classes of tropical beach images and non-tropical beach images. It may be desired that the model only detect images of the first sub-class, of tropical beach images. One important characteristic of tropical beaches may be that the water is usually "greener than" the sky. Thus, the model can be refined such that the greener than relationships from image regions corresponding to the water to image regions corresponding to the sky are strengthened. Thus, the model may be refined or altered by iterating the process shown in FIGS. 2–2B, where the model information from previous iterations and the new information are merged. After each iteration, a new deformable template may be generated.

It should be noted that images may be subgrouped into sets which have the most consistent relationships. One model may not sufficiently describe a broad class of images. For instance, beaches in the summer may look very different than snowy beaches in the winter. If presented with both types of images, the system may find very few consistent relationships among all the example images. The system or a user can group the images into a plurality of subgroups where the images in each of the subgroups have many relationships in common. The system can, thus, build two separate templates for beaches. One template for beaches in summer and another template for beaches in winter. These two templates can be used to detect images from the general class of beaches.

It should also be noted a class model may be generated from both positive and negative example images. A user or other may specify images that should be described by the class model. These are called positive examples. A user or other may also specify images that should not be described by the class model. These are referred to as negative examples. By providing both positive and negative example images, a class model can be generated that includes the relevant consistent attributes of the positive example images and does not include (e.g. does not encode or negatively encodes) the relevant attributes of the negative examples. Negatively encoding means storing relationships that have a tag specifying that they should not be present in a image which belongs to the class described by the model.

Figure 3:
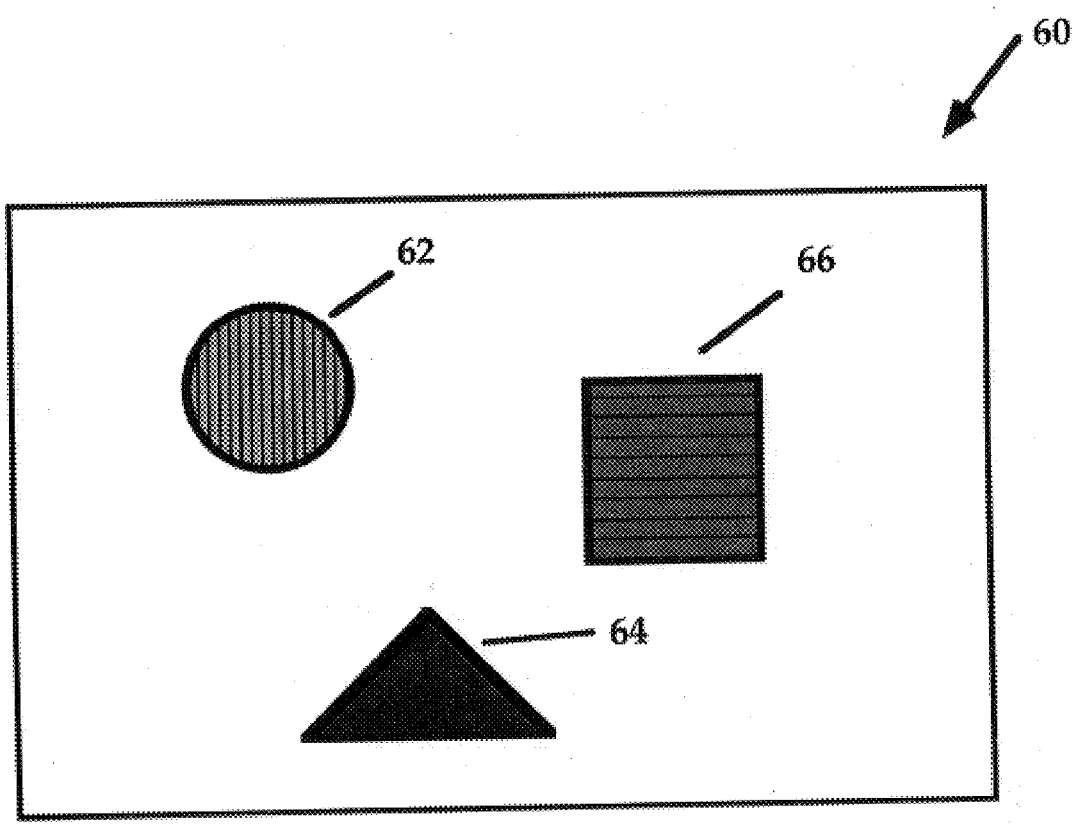
FIG. 3 is a diagram of an image having a plurality of image regions with particular spatial and photometric relationships.

Referring now to FIG. 3, an image 60 as shown in FIG. 3 includes plurality of image regions 62–66 each having different color and photometric attributes.

The technique of the present invention uses qualitative relationships to form a scene model. Several images of the same real scene may look very different when those images represent the scene in various lighting conditions, viewing positions, different imaging devices and over other varying scene parameters. Considering only the spatial and photometric aspects of a scene, absolute color, luminance, and spatial position of image regions cannot usually be used as reliable indicators of a scene's identity. However, their relative luminance, color and spatial positions remain largely constant over these various conditions. The human visual system too seems more adept at detecting and encoding qualitative relationships rather than absolute relationships. This indicates that relative relationships may be used to create more robust descriptions of visual stimuli.

In this particular example, relative spatial and photometric relationships between image patches 62, 64, 66 are used to generate a model. Thus, in this specific example, a plurality of relative spatial relationships between each of the image patches 62–66 can be defined. For example spatial relationships in image 60 include the following spatial relationships: image region 62 is above image region 64; image region 64 is below image region 66; and image region 62 is to the left of image region 66.

Similarly, relative photometric relationships between each of the image regions 62–66 can be identified. For example, with respect to relative luminance relationships, image region 62 is brighter than image region 66, image region 64 is not as bright as image region 62 and image region 66 is brighter than image region 64.

With respect to relative color relationships and using an RGB color scheme, region 62 is more green than region 66, and region 62 is less blue than region 66. Likewise, region 66 is less green than region 64; and region 66 is more blue than region 64. Thus, a plurality of relative relationships have been identified between each of the regions 62–66.

These relationships define a model which specifies the manner in which various images patches are represented as well as the relationships between the patches. Thus, in this particular example, the model is provided from spatial and photometric properties of the image patches 62, 64, 66 and more particularly the model is provided from the relative relationships between the spatial and photometric properties of the images patches 62, 64, 66.

Although the relative relationships have here been identified as spatial and photometric relationships, as mentioned above, other relative relationships between other kinds of image attributes may also be used. For example the relative relationships may be computed over texture properties (indicated by cross hatching in FIG. 3) or shapes of patches 62–66. For instance the texture in patch 62 is more vertically oriented than the texture in patch 66. Looking at shape characteristics, patch 62 is more round in shape than patch 64.

Figure 4:
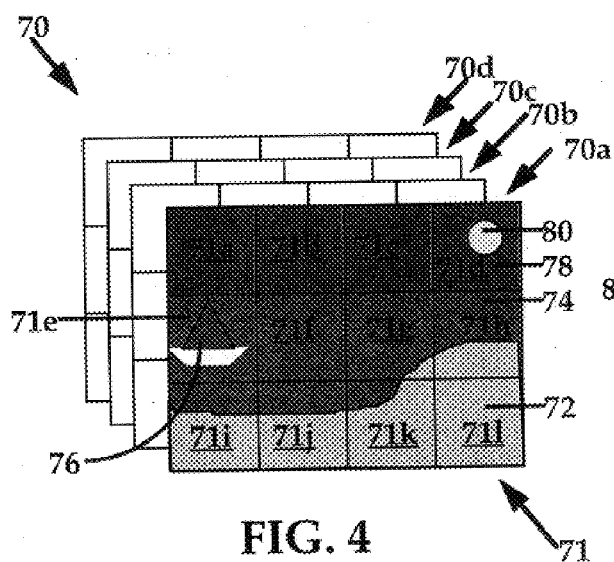
FIG. 4 is a series of beach scene images.
Figure 4A:
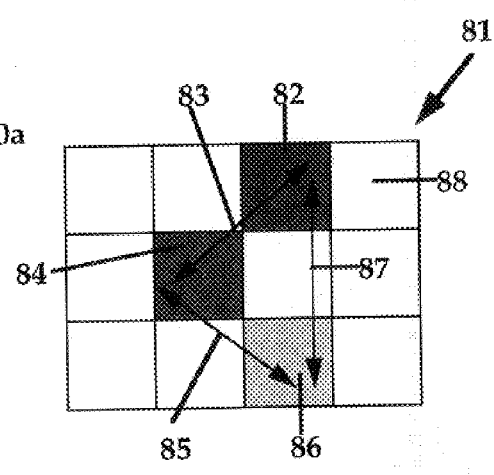
FIG. 4A is a deformable image template generated from the beach scene images of FIG. 4.

Referring now to FIGS. 4–4A, a sequences of beach images 70a–70d, generally denoted 70, are used to generate a model 81 (FIG. 4A). Each of images 70a–70d are subdivided into regions 71a–71l generally denoted 71 as shown in image 70a. Each of the image regions 71 contain one or more pixels. In this case the image regions 71 are all equally sized. However, in general the images 70 may be partitioned into image regions of unequal size and shape with each of the image regions 71 having one or more pixels. An image region can be described by its attributes such as overall color, texture, spatial position and shape. From image 70a, a plurality of relative relationships between the image regions 71 can be identified. Each of the image regions 71a–71l has relative relationships with each of the other image regions in 71a–71l. For instance image region 71d which contains the sun has an overall color which is less blue than region 71c (a sky patch). Similar relationships can be identified between the image regions in each of images 70b–70c. Relationships are also computed between the image regions in each of images 70b–70d.

If it is desired to form a model for images of beach scenes, then it is necessary to identify image characteristics or image properties which would be expected to be found in most images of beach scenes. Relative relationships between image regions that are consistent over the class of beach scenes are identified. The particular relative relationships can be used to classify or detect different images as either belonging to the class of image beach scenes or not belonging to the class of image beach scenes. For instance, using photometric and spatial relative relationships, beach scenes may be characterized by a triplet of image regions in which a first one of the regions is above and more blue than remaining regions and a second one of the regions is more green than the remaining the regions, and a third one of the regions is more brown than and below the first and second regions. This description captures the general relative relationships between the sky, water, and sand regions which are common to most beach scenes. The relative relationships allow the scene concept to tolerate differences such as illumination, geometry, viewpoint between different images of beaches. Thus it is the relative relationships such as colors and spatial relationships between regions 71 in the image which are important rather than the absolute color or position of the image regions.

Note for instance image region 88 (upper right hand corner) was not included in the model beach image 81 because the sun in image patch 71d was not always in the same position in the images 70b–70d. Therefore the relative relationships between patch 71d and other image regions in 71 did not remain constant over all the example images 70b–70d.

Figure 4B:
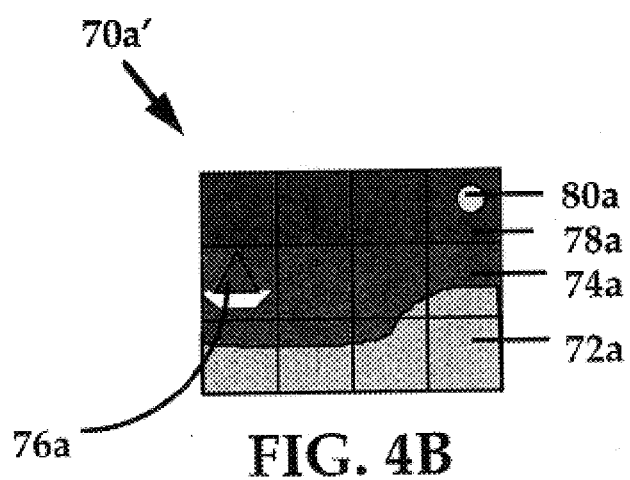
FIG. 4B is the beach scene of FIG. 4 at a different scale.
Figure 4C:
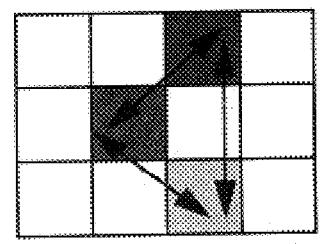
FIG. 4C is a deformable model extracted from the beach scene of FIG. 4B.
Figure 4D:
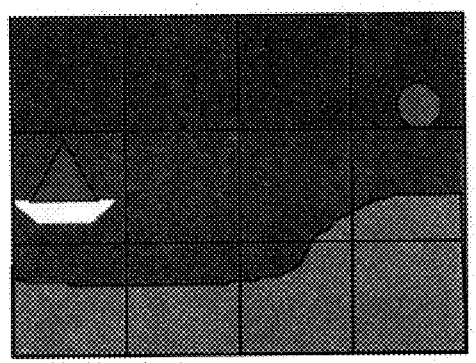
FIG. 4D is the beach scene of FIG. 4 at a different illumination.
Figure 4E:
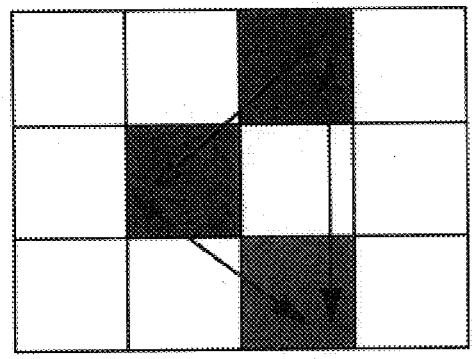
FIG. 4E is a deformable model extracted from the beach scene of FIG. 4D.
Figure 4F:
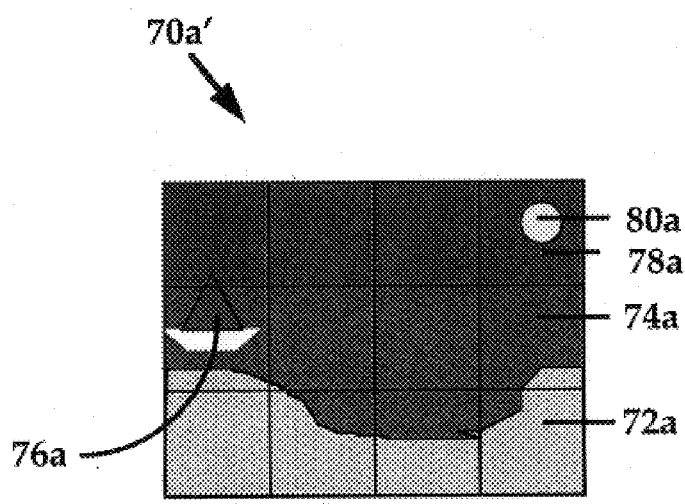
FIG. 4F is the beach scene of FIG. 4 with a geometry change.

Model 81 therefore represents a particular set of relative photometric and spatial relationships of a selected set of image patches that can be used to classify or detect images of beach scenes regardless of significant changes in image size, changes in image illumination and changes in image geometry as illustrated by FIGS. 4B, 4D and 4F.

Model 81 includes three salient regions 82, 84, 86 and the relative relationships between these regions. Arrows 83, 85, 87 denote the relative relationships between regions 82, 84, 86. Since it is the relative relationships which are important, image patch 86 need not be identical in color to beach region 72 which falls primarily within image regions 71i–71l (FIG. 4) as long as patch 86 satisfies the relative relationships with respect to patches 82, 84 of model 81. Furthermore, if the color of beach region 72 as primarily contained in image regions 71i–71l is to be coarsely quantized, then the quantized color may correspond to the color of patch 86. This beach scene model 81, or more specifically beach scene template 81, can be learned by looking at the series of beach scene image examples 70, as denoted in FIG. 4. Alternatively model 81 can be hand-crafted.

FIGS. 4B, 4D, and 4F show novel beach scenes (e.g., images from an image database) that may differ from the example images 70 (FIG. 4) by a change in scale, a change in illumination, or a change in scene geometry. The important point is that the same beach scene model 81 shown in FIG. 4A still encompasses the variations.

Figure 4G:
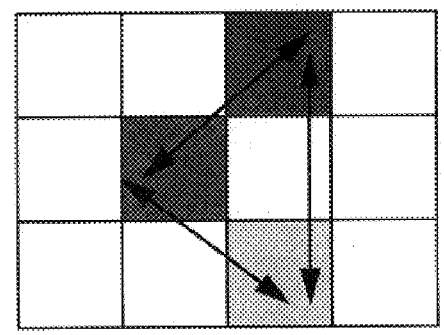
FIG. 4G is a deformable model extracted from the beach scene of FIG. 4F.

As can be seen in FIGS. 4C, 4E, and 4G template 81 is positioned on the corresponding salient regions in each of FIGS. 4B, 4D, and 4F, respectively. The relative relations encoded in the original model 81 are still valid over the indicated regions in the new images. Therefore, the novel images can be correctly classified as beach scenes using the technique of the present invention.

Figures 5, 5A:
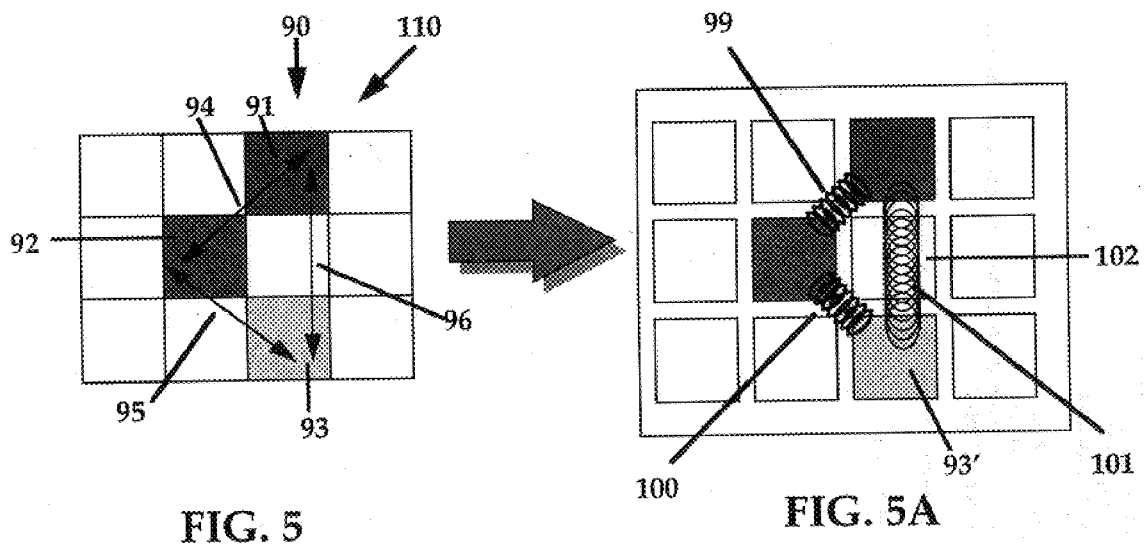
FIGS. 5 and 5A illustrate a deformable model.

Referring now to FIG. 5 a model provided from color and spatial relationships includes first, second and third patches, each of the patches having relative relationships to each other. The grid in FIG. 5 denotes the partitioning of the input image into patches.

As shown in FIG. 5A, the patches can be considered to be coupled by a spring like structure which allows deformation of the spatial relationships of the patches. Thus, the relationships between the patches have been encoded and an elastic structure is established between each of the patches which allows the template to be applied as a deformable global organization of the image patches.

The spring like structure between the patches may be implemented, for example, in the following manner. Assume the relationships between the colored patches as shown in FIG. 5 are identified. The model could be encoded to represent that the blue patch is a predetermined distance (e.g. 7 pixels) away from the brown patch. This is absolute positional information. Now the model could be applied to a new image. However it may be necessary to stretch or shrink the positional relationship between the blue and brown patches.

The more the model must be stretched or deformed to match a particular image, the less likely it is that the image belongs to the class There is, however, no limit as to how far the model can be stretched as long as the patches stay within image boundaries and maintain their mutual qualitative spatial relationships. Likewise when compressing the model, the model must maintain the same relative spatial structure.

For example, brown patch 93' could be moved to position 102 in FIG. 5A. In this case, if the relative spatial relationship between green patch 92 and brown patch 93 is that the brown patch 93 must be to the right of the green patch 92 then the relative relationships are maintained. However, if the relative spatial relationship, between the green patch 92 and brown patch 93 is that the brown patch 93 must be to the right of and below the green patch 92 then the relative relationships are not maintained and the model 98 could not be validly deformed by moving brown patch to position 102. It should be noted that the center, top edge or bottom edge of the patch regions could be used to define the position of individual patches.

It should also be noted that changing patch size is included in the concept of a deformable model. It should be noted that deformable models in conventional systems do not encode elastic relations between patches.

It may be desirable to change a patch size for example, when trying to identify an image of a beach scene which has only a very small portion of a beach visible. The beach portion may be represented as a patch having a brown color. When a large brown model patch is applied to this image, the brown patch may overlap substantially with some of the water which typically has a blue color. The overall color of the image region defined by the brown patch boundaries have a large blue component. The brown patch denotes that the image region should be browner than other image regions or have a generally brown color. In this case, these specifications from the model would be violated in the image. However, by changing the patch size, it may be possible to provide the brown patch with a size which fits directly on the beach. Now the relative color relationships between this region in the image and other regions are consistent with the model.

In some instances, it may be desirable to find the best match using all possible valid deformations of the template. It should be noted, however, that the greater the number and magnitude of the deformations required to produce a match, the lower the confidence level that the image found with the so-deformed template belongs to the class of the template.

It is also possible to combine the relative relationship deformable template technique of the present invention with absolute positional or image characteristic information. For example, if the position of a specific image region or object is important in an image classification or detection operation, then this absolute positional information can be combined with relative relationship information in the image model. For example, if what is important in an image of a beach scene is that the sun always be in the upper left hand corner of the image, then this absolute positional information could be combined with the deformable beach model to aid in classification and detection operations.

Referring now to FIGS. 6–7A in which images 110, 118 are images of the same beach scene with image 118 being a close up of the beach scene and image 110 being a distal view of the beach scene. An image template 114 applied to image 110 includes patches 111, 112, 113 which are coupled together via springs 115, 116, 117. In this particular example, the template 114 is provided as a pre-defined template. However template 114 could also be generated from one or more beach scenes similar to the beach scenes discussed above in conjunction with FIG. 4 and using a technique similar to the technique described above in conjuction with FIG. 2. Template 114 is provided from selected relevant relative spatial and photometric relationships. Springs 115, 116, 117 indicate that template 114 is a deformable template 114 meaning that the particular spatial relationships of images patches 111, 112, 113 can change relative to each other as long as the general relative spatial and photometric relationships remain the same. That is, although in template 114 a relatively blue patch 111 must remain above a relatively green patch 112, the particular distance by which blue patch 111 must remain above green patch 112 is not fixed. This is illustrated by template 114' (FIG. 7A). Thus, template 114 can be deformed and yet still remain valid.

For template 114' to classify image 118, template 114 must be deformed to provide template 114'. Thus the deformable template 114 is still valid and as deformed can detect the beach scene. In this case, the application of a deformable template involves shifting the positions of the constituent patches around the image to be classified while staying within the constraints of the qualitative spatial relations. The goal is to find the best match between regions of the model and regions of the image.

It should be noted that even if the images 110, 118 were not of the same beach scene, the same deformable template principle would apply.

Figure 8:
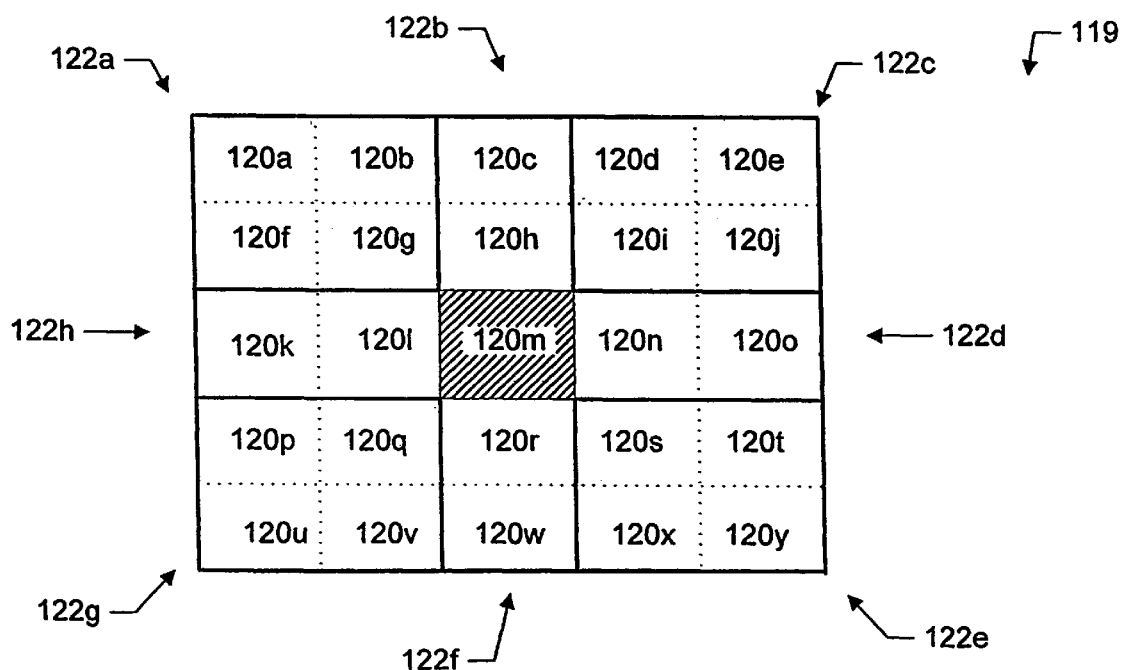
FIG. 8 is a diagrammatical view of an image having a plurality of relative relationships.

Referring now to FIG. 8, an image 119 includes a plurality of patches 120a–120y generally denoted 120. If image 119 corresponds to a low resolution image, then each of the patches 120 represent image regions (e.g. a 50×50 pixel region) of a low resolution image.

In image 119, all of the relationships between each of the patches 120 are computed. For example, taking patch 120m as representative of each of the patches 120, the relationships between patch 120m and each of the patches 120 in other image regions (denoted by dotted lines in FIG. 8) are computed. Thus, a first one of the patches 120, here patch 120m, has been selected and the relative relationships are computed between patch 120m and each of patches 120a–120l and 120n–120y.

In the case where the relative image region relationships are taken to be the relative spatial and photometric relationships between pixels, the photometric and spatial relationships between patch 120m and each of patches 120a–120l and 120n–120y are computed.

For computational purposes the number of relationships to be stored can be reduced through the used of equivalence classes. For each patch 120, the patch relationships which correspond to patch pairwise relationships are reduced to an equivalence class. Thus, in this particular example directional equivalence classes 122a–122h (denoted by solid lines) are used. Here eight directional equivalence classes are identified (upper left 122a, up 122b, upper right 122c, right 122d, lower right 122e, down 122f, lower left 122g, left 122h).

It should be noted, however, that other equivalence classes may also be used. In short any grouping of image regions based on some common property between the image regions could form an equivalence class. That is, the equivalence class may be provided from any grouping scheme in which patches are grouped in a manner which eliminates redundant relationships and which eliminates the need to store exact positional patch information. The groupings need not be the same size nor the same shape.

As mentioned above, in this particular example directional equivalence classes are used. Thus, image regions 120a, 120b, 120f, and 120g are to the upper left of image region 120m. Image regions 120c and 120h, are directly up or above image region 120m. Image regions 120d, 120e, 120i, and 120j are to the upper right of image region 120m. Image regions 120n, 120o are directly right of image region 120m. Patches 120s, 120t, 120x and 120y are below and to the right of patch 120m. Patches 120p, 120q, 120u and 120v are below and to the left of patch 120m. Patches 120k, 120l are directly to the left of patch 120m.

Next, a relationship map which is the collection of all pairwise patch relations, is relaxed to allow for positional variance. That is, the attributes of each patch 120 are inherited by at least one other neighboring patch 120 (e.g. patch 120n). By allowing patches to inherit the relations of other neighboring patches, a model which can be applied to different images representing many variations of a scene is provided.

The relaxation step can also be accomplished during the template generation process by verifying relationship consistencies not only between corresponding patches in each of the example images but also between their neighbors.

Once the attributes and relative relationships for each patch have been identified, consistent relationships between a plurality of example images are identified for use in a model.

Figure 9A:
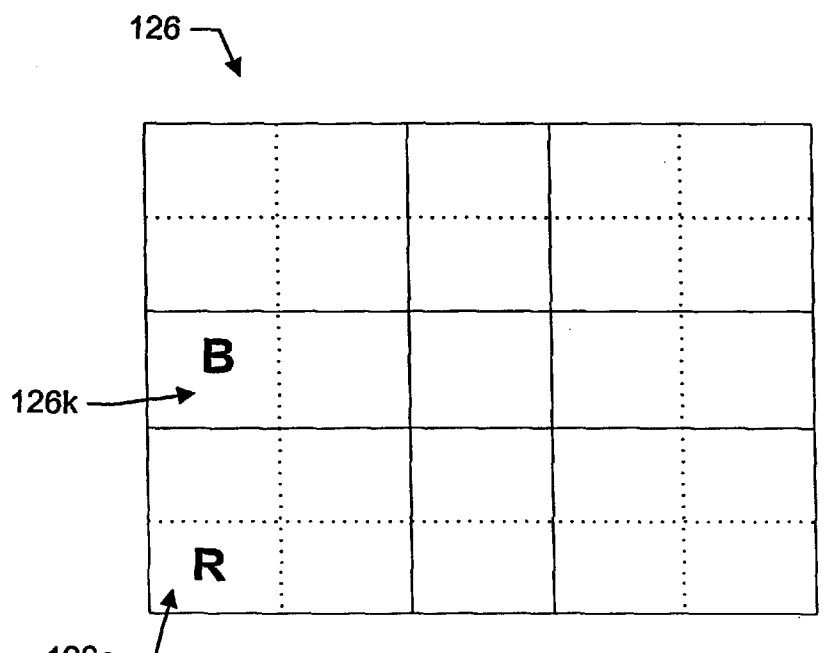
Figure 9B:
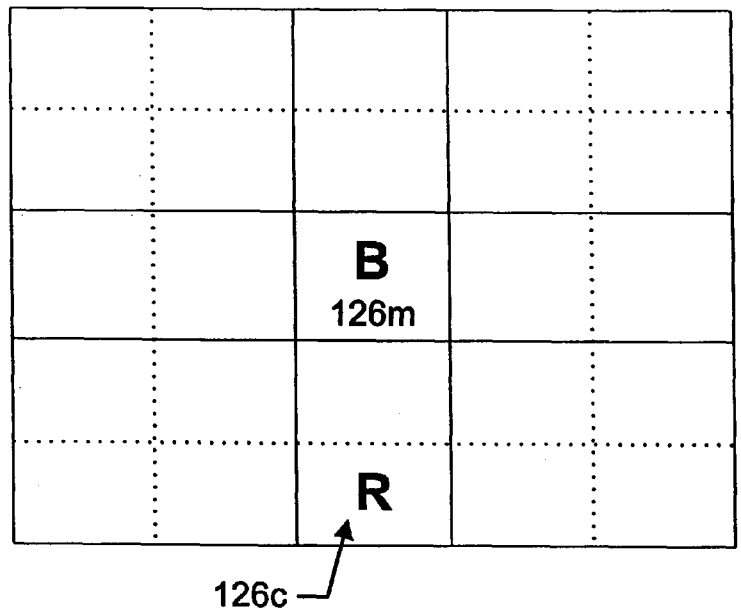
Figure 9C:
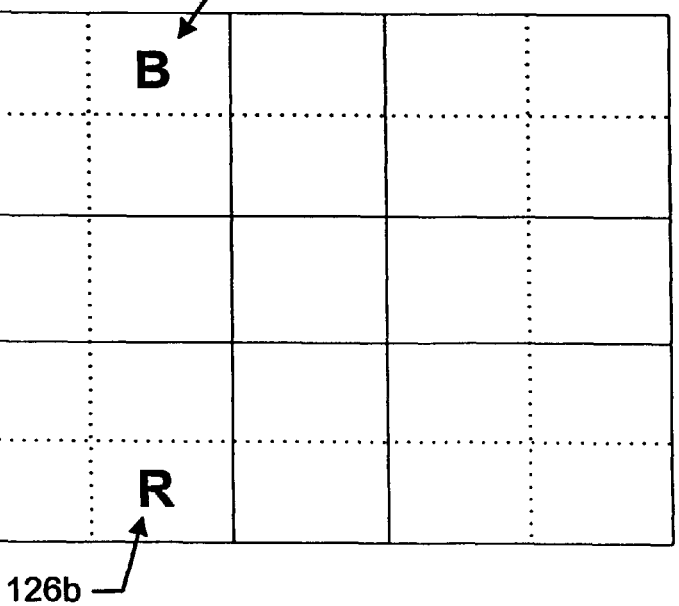

Referring now to FIGS. 9–9C, the manner of associating attributes of one image region with another image region is explained. It should be noted that this technique assumes that certain positional relations exist between regions of images belonging to a scene class. That is, a scene may have local variations, but scenes belonging to the same class have a similar and generally consistent global organization. For example, in a beach scene class each large image segment across different images is generally similar. For example, the primary image segments in an image of a beach scene may typically correspond to the sky, the water and the beach.

Turning now to FIG. 9, an image 126 is divided into a plurality of image regions 126a–126y. Each of the image regions 126a–126y has a plurality of attributes.

Each image region inherits the attributes of its immediate neighbors and each of the relative relations existing between its immediate neighbors and other image regions.

Thus, inheritance of relations allows for positional variance during the model creation process. Thus, if one of the attributes of region 126b is the color red as denoted by the "R" and it is below a bluer patch such as patch 126l, then this color, relative relationship pair becomes an attribute of region 126b.

Referring now to FIGS. 9A and 9B, in FIG. 9A image region 126a is red and is shown below a blue patch 126k and in FIG. 9B image region 126c is red and is below a blue patch 126m. Note that the image regions having the R designations in each of 9, 9A and 9B need not be the same exact color. They need only to be generally red. This applies also to the B's. Assume that these three images are the example images, then ask: what are the consistent relationships between these images. For computational efficiency, in the current system, consistent relationships are only computed between corresponding regions in each of the images. This, however, is not intolerant to positional variations because of the relationship relaxation step. For instance, in image 126, since neighboring regions have inherited their neighbors attributes, then the regions 126a, 126c will have the attributes of region 126b associated with them, while image region 126b will inherit the attributes of both regions 126a, 126c. If both image regions 126a, 126c in images 9A and 9B respectively had similar relationships to the other image patches as region 126b in FIG. 9, then these relationships will be greatly strengthened. for the image patch 126b in the resulting model. During detection, the best match will be obtained if the new image had a patch with the attributes of region 126b exactly in location 126b. But, good matches will also be obtained if the new image had a patch with attributes of region 126b in locations 126a or 126c due to the inheritance of attributes. Furthermore, by incorporating the notion of a deformable model, we will also be able to detect new images such as image 126 (FIG. 9C) that preserve the spatial and photometric relationships extracted during the model creation process.

It should be noted that all of the relationships between all combinations of the image patches in FIG. 9 could be computed (e.g. could compute relationships between pairs of image patches triples of images patches, quadruples of image patches etc . . . ) and the same computations could be done for FIGS. 9A, 9B where these are the example images. Then each of the combinations could be examined for consistencies. For computational efficiency, however, in the present instance of the technique, relationships between pairs of regions (i.e. pairwise relationships) are computed. While the use of such high order relations (triples, quadruples etc.) leads to more distinctive class models, their computation gets progressively more difficult. For instance, in an image with n patches, while there are only on the order of $n^2$ pair-wise relations, there are on the order of $n^3$ triples.

Figure 10:
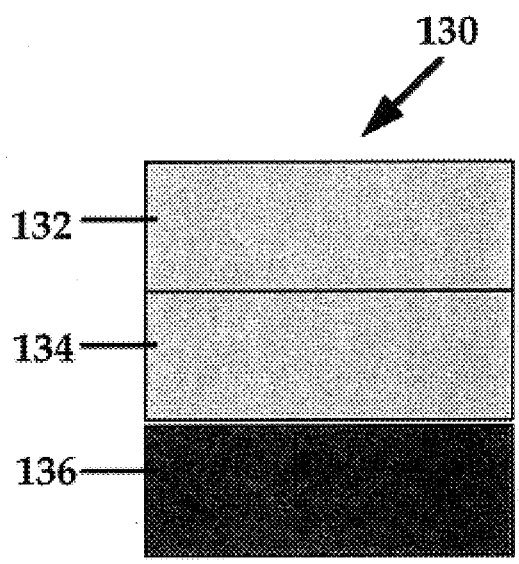
FIGS. 10 and 10A are a series of diagrams illustrating image patches having particular relationships.
Figure 10A:
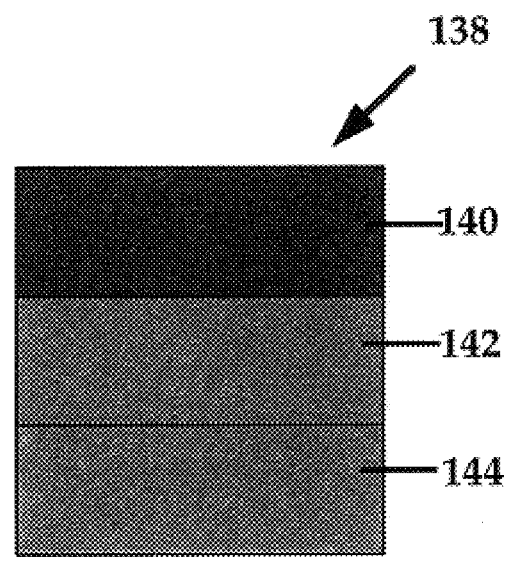

Referring now to FIGS. 10 and 10A, an example of two synthetic field images 130, and 138 are shown. Image 130 includes image patches 132, and 134 which are blue, and image patch 136 which is green. We use these simple images to illustrate the process of determining consistent inter-patch relations to develop a class model. In view of the simplicity of the images, we have omitted the relaxation process here. Image 138 includes image patch 140 which is blue and image patches 142 and 144 which are green. The relative relationships for each of the respective field images have been computed and for each image patch, the relations have been reduced to vertical directional equivalence classes. These relations are shown in Table 1. It should be noted that in this example, colors are quantized into mainly blue or mainly green components and that relative colors are computed only with respect to the blue and green components.

TABLE 1

| | Example Image 130(FIG. 10) | | | Example Image 138(FIG. 10A) | | |
|---|---|---|---|---|---|---|
| Patch | Patch Color | Relative Direction | Relative Color to Other Patch | Patch | Patch Color | Relative Direction | Relative Color to Other Patch |
| 132 | Blue | above | N/A | 140 | Blue | above | N/A |
| 132 | Blue | below | same | 140 | Blue | | |
| 132 | Blue | below | more blue than less green than | 140 | Blue | below | more blue than less green than |
| 134 | Blue | above | same | 142 | Green | above | more green, less blue |
| 134 | Blue | below | more blue than less green than | 142 | Green | below | same |
| 136 | Green | above | more green than less blue than | 144 | Green | above | more green than less blue than |
| 136 | Green | below | N/A | 144 | Green | above | same |
| | | | | 144 | Green | below | N/A |

It should be noted that relative colors are computed only with respect to the blue and green components. Colors are quantized into mainly blue or mainly green categories.

From this set of relative relationships, consistent relationships between the two example images are identified. Thus, in this particular example the consistent relationships between field image 130 and field image 138 are that an upper patch must have more of a blue component than a lower patch which, in turn, must have more of a green component than the upper patch.

Figure 10B:
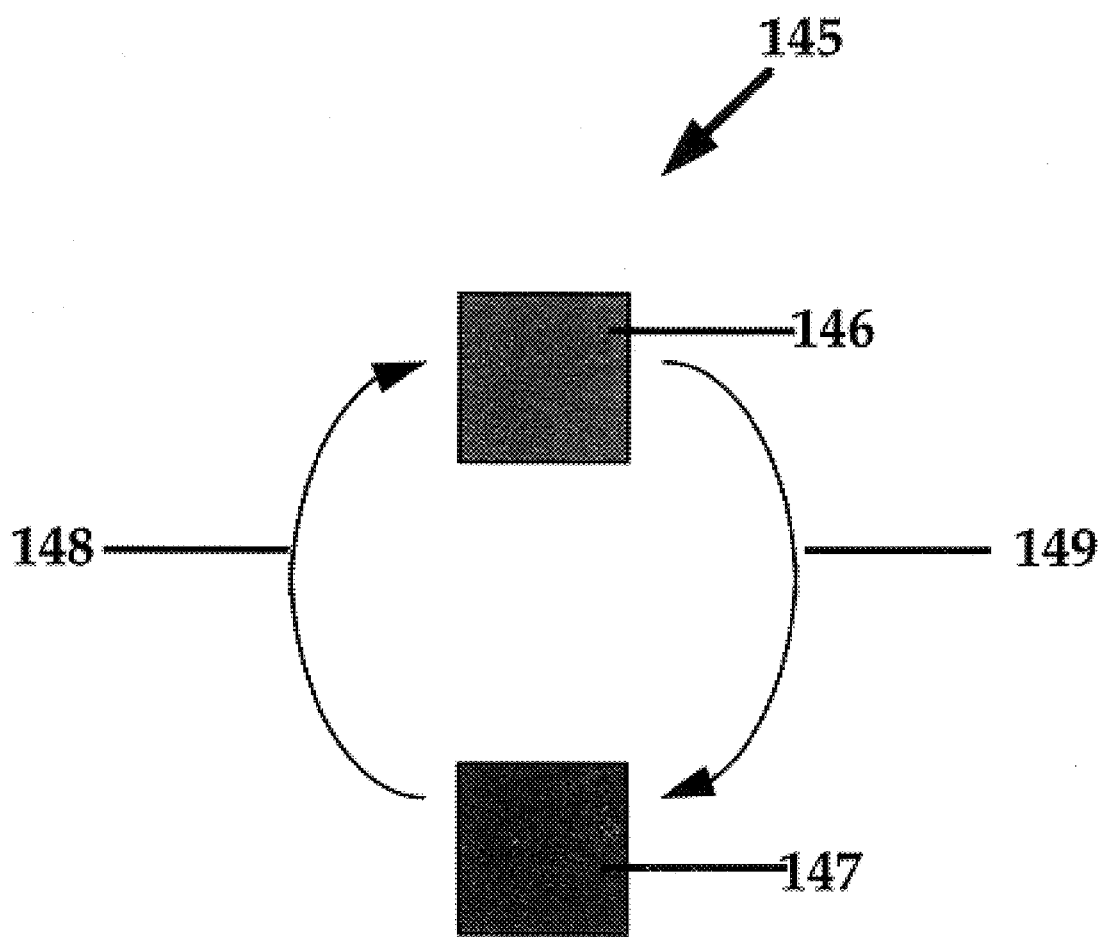
FIG. 10B is a model formed from the diagrams of FIGS. 10 and 10A.

This is pictorially represented in FIG. 10B as model 145 provided from image patches 146, 147. Arrows 148, 149 denote the relative spatial and photometric relationships between image patches 146, 147.

Figure 10C:
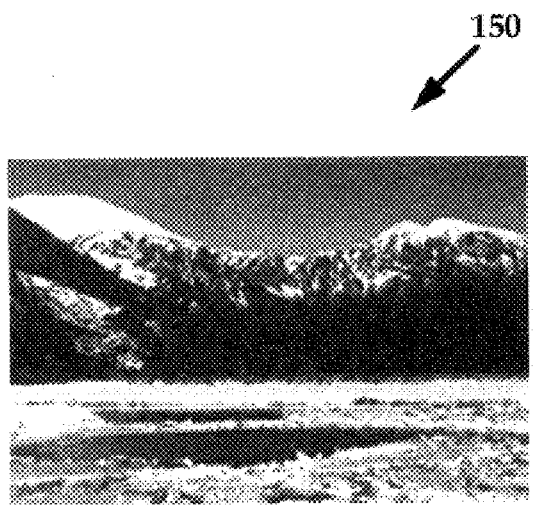
FIG. 10C is an image of a mountain scene.
Figure 10D:
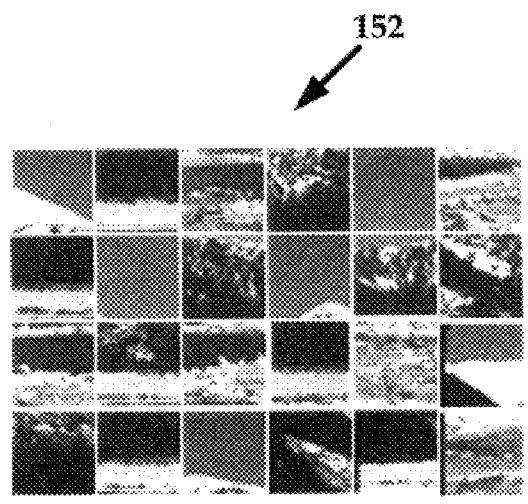
FIG. 10D is a scrambled image of the mountain scene of FIG. 10C.

Referring now to FIGS. 10C and 10D, an image of a mountain scene 150 has been scrambled and randomly reassembled to create image 152.

Images 150, 152 together illustrate that it is the overall organization rather than the unstructured color and texture statistics are important for recognition or classification of a scene. Thus, the configural recognition approach of the present invention uses global organization with relative relationships.

Since the technique of the present invention uses relative relationships, such as relative relationships between spatial and photometric attributes, while image 150 when provided to a mountain template would be recognized as an mountain image scene, image 152 on the other hand would not, even though it contains all of the same image patches as image 150. This is because the image patches would not have the correct relative spatial and photometric relationships.

Figure 11:
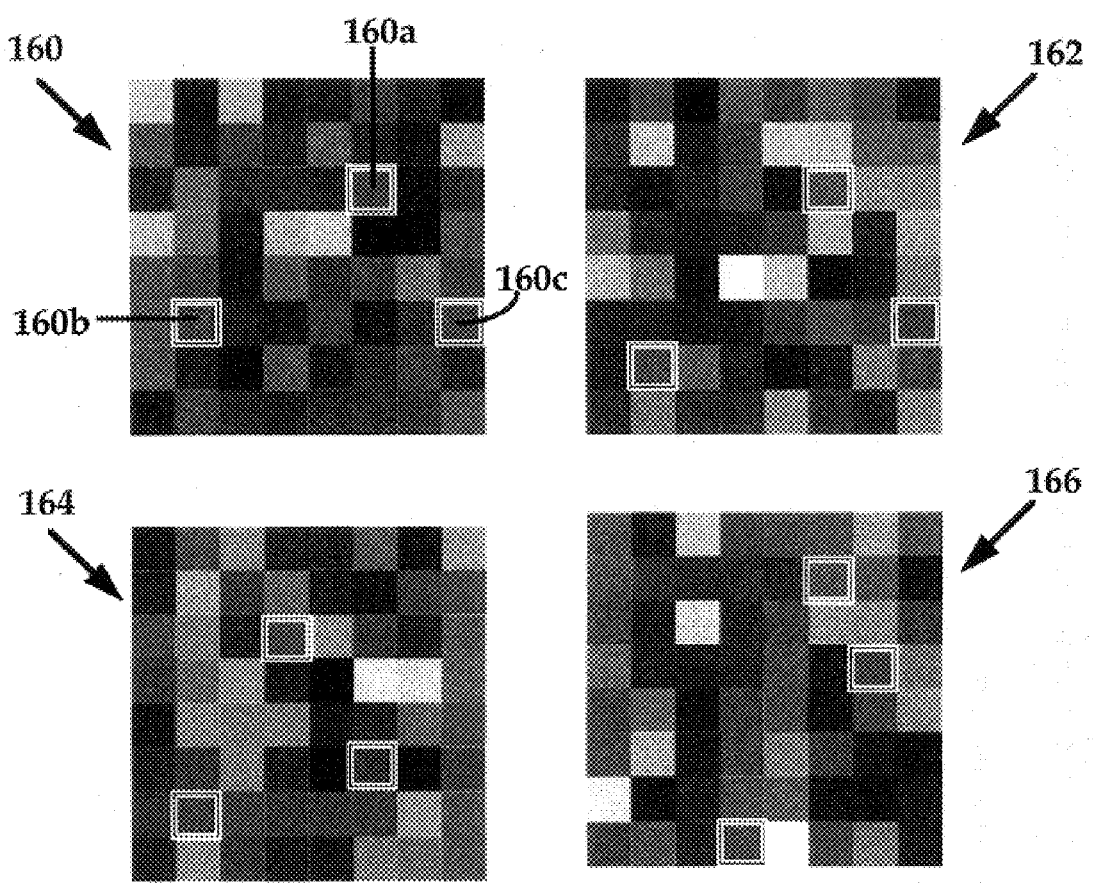
FIG. 11 is a series of images from which a model may be generated.
Figure 11A:
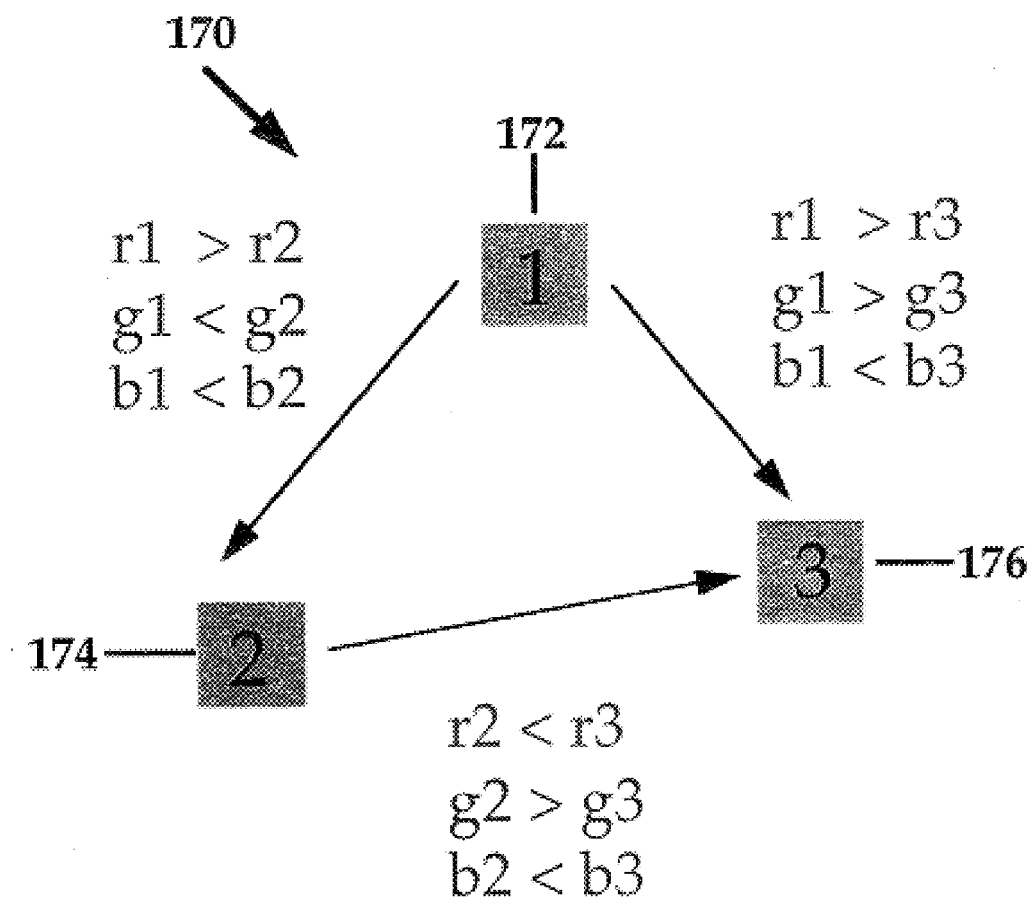
FIG. 11A is a model generated from the images in FIG. 11.

Conventional image retrieval systems, on the other hand, which merely use color histograms or other techniques such as local texture statistics should recognize image 152 as a mountain image since the image contains all the local components of a mountain image scene. Referring now to FIGS. 11 and 11A, a plurality of example images 160–166 are provided to a relationship processor. The images were designed so as to include predetermined image patches 160a, 160b, 160c. The relationship and association processors automatically identified that the most consistent relative spatial and color relationships among all the images patches existed between patches 160a, 160b, 160c in images 160–166. The learned concept may be pictorially expressed, as shown in FIG. 11A, which indicates that image patch 172 is more red than image patch 174 and image patch 176, image patch 172 is less green than image patch 174, and more green than image patch 176, image patch 172 is less blue than patches 174 and 176.

Figure 12:
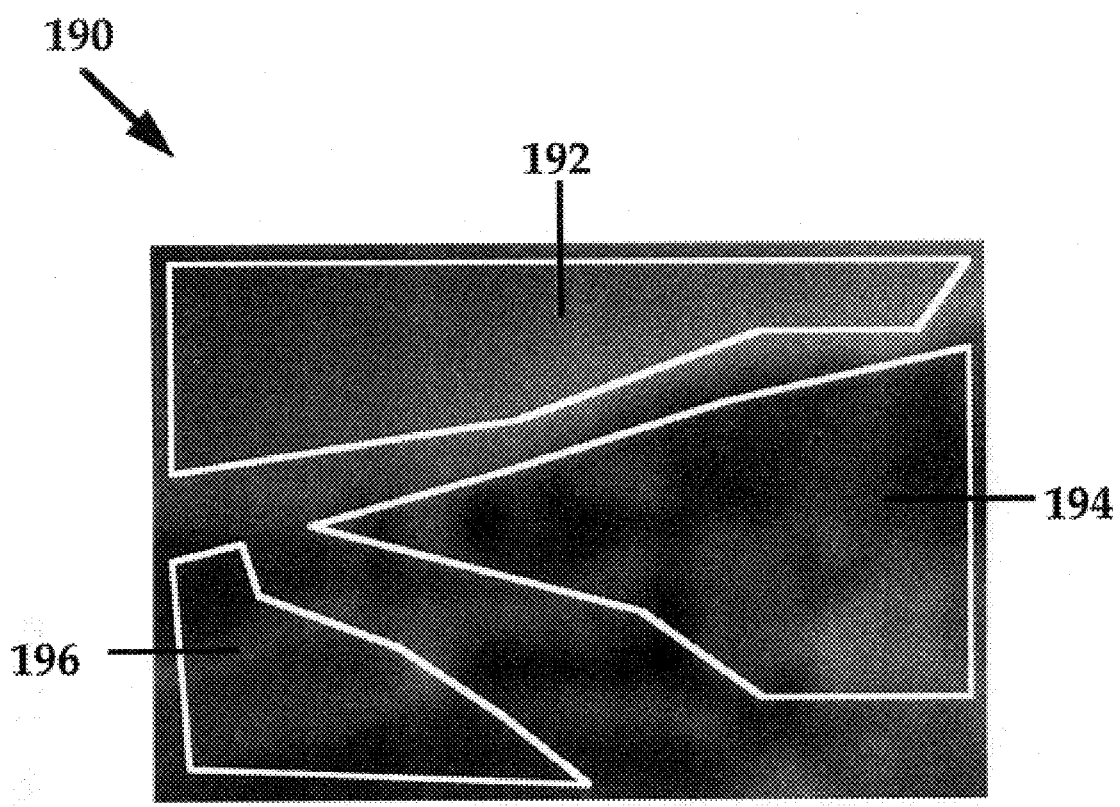
FIG. 12 is an images having grouped regions.

A possible modification of the existing system involves grouping together image patches with similar attributes and relative relationships to other regions in the image. Thus FIG. 12, includes an image 190 having a plurality of grouped regions 192, 194, and 196. Regions 192–196 are formed by grouping together patches which have similar colors and more importantly similar relationships to other patches in the image. The grouped image regions are then supplied to the relation detector which determines consistent relations between these groups across several images. This technique reduces computational complexity of consistent relation detection by reducing the number of image regions that need to be considered.

Changes in the apparatus and methods herein disclosed will occur to those skilled in the art and various modifications and embodiments are envisioned which may be made without departing from the scope of the invention. The matter set forth in the foregoing description of the disclosed network and the accompanying drawings is offered by way of illustration. Consequently, the invention is to be viewed as embracing each and every novel feature and novel combination of features disclosed herein and is to be limited solely by the scope and spirit of the appended claims.

We claim:

1. A method for applying a template to an image comprising the steps of:

(a) providing a first image patch having a first image patch size;

(b) providing a second image patch having a second image patch size;

(c) placing the first image patch in a first image patch position;

(d) placing the second image patch in a second image patch position;

(e) identifying a first non-geometric property of the first image patch;

(f) identifying a first like non-geometric property of the second image patch and;

(g) identifying a first relative relationship between the first property of the first image patch and the first property of the second image patch wherein the relative relationship qualitatively relates the property of the first image patch to the property of the second image patch.

2. The method of claim 1 further comprising the step of defining a relative position between the first image patch and the second image patch wherein the relative position of the first image patch with respect to the second image patch corresponds to one of: (1) above; (2) below; or (3) aligned with.

3. The method of claim 1 wherein:

the first non-geometric property of the first image patch corresponds to a first photometric property of the first image page and is at least one of a chromatic property and a luminance property of the first image patch; and the first non-geometric property of the second image patch corresponds to a second photometric property of the second image patch and is at least one of a chromatic property and a luminance property of the second image patch.

4. The method of claim 3 wherein the first relative photometric relationship defines a photometric relationship of the first image patch as being one of: (1) less than; (2) greater than; or (3) equal to with respect to the like photometric property.

5. The method of claim 3 further comprising the step of changing the first relative relationship between the first photometric property of the first image patch and the first photometric property of the second image patch including the step of decreasing a distance relationship between the first image patch and the second image patch.

6. The method of claim 5 further comprising the step of changing the size of at least one of the first and second image patches.

7. The method of claim 3 further comprising the steps of:

providing a third image patch; and identifying a first one of an absolute position and an absolute photometric property of the third image patch with respect to at least one of the first and second image patches.

8. An apparatus for generating a class model from an image, the apparatus comprising:

means for dividing the image into a plurality of image region;

means for identifying a plurality of image region attributes in each of the plurality of image regions;

means for identifying first ones of the plurality of image regions having at least one like image region attribute and at least one like relative relationship to at least one other image region of the plurality of image regions;

means for identifying second ones of the plurality of image regions having at least one like image region attribute and at least one like relative relationship to at least one other image region of the plurality of image regions wherein the first ones of the plurality of image regions have at least one like attribute and one like relative relationship which is different from the at least one like image region attribute and at least one like relative relationship of the second ones of the plurality of image regions; and means for grouping the first ones of the plurality of image regions into a first image region group and for grouping the second ones of the plurality of image regions into a second image region group.

9. The apparatus of claim 8 further comprising a relation detector coupled to the means for grouping, the relation detector for determining consistent relationships between the first and second image region groups.

10. The apparatus of claim 9 further comprising means for forming an image model from the consistent relationships between the first and second image region groups.

11. A method for processing an image, the method comprising the steps of:

(a) dividing the image into a plurality of image regions;
(b) identifying first ones of the plurality of image regions having at least one like attribute and at least one like relative relationship to at least one other image region of the plurality of image regions;
(c) identifying second ones of the plurality of image regions having at least one like attribute and at least one like relative relationship to at least one other image region of the plurality of image regions wherein the first ones of the plurality of image regions have at least one like attribute and at least one like relative relationship which is different from the like attribute and at least one like relative relationship of the second ones of the plurality of image regions;
(d) grouping the first ones of the plurality of image regions into a first image region group; and
(e) grouping the second ones of the plurality of image regions into a second image region group.

12. The method of claim 11 further comprising the step of determining consistent relationships between the first and second image region groups.

13. The method of claim 12 further comprising the step of forming an image model from the consistent relationships between the first and second image region groups.

14. An image processing system comprising:
(a) an image database;
(b) an image retrieval device coupled to said database for retrieving images from said image database;
(c) a relationship processor, coupled to said image retrieval device, said relationship processor for identifying relationships between image characteristics of images retrieved from said database;
(d) a template generator, coupled to said relationship processor, said template generator for encoding relationships between characteristics which are consistent between images retrieved from said database as an image template; and
(e) an image detector for applying the image template to images in said image database to detect images belonging to a particular class of images stored in said image database.

15. The image processing system of claim 14 wherein said image detector detects novel images having relative relationships between selected image regions thereof which are consistent with the relative relationships encoded in the image template.

16. The image processing system of claim 15 wherein said image detector includes means for aligning, via the image template, a first region of a first image and a second region of a second different image.

17. The method of claim 16 further comprising the step of associating each of the relative relations from a first image region with a second different image region.

18. The method of claim 17 wherein the second different image region has at least one boundary point which contacts the boundary point of the first image region.

19. A method for generating a class model comprising the steps of:
(a) selecting a first image region from a plurality of image region;
(b) identifying a first relative relationship between a first property corresponding to a first one of a color attribute and a texture attribute of a first one of the plurality of image regions and a first one of a color attribute and a texture attribute of a second one of the plurality of image regions; and
(c) storing the relative relationship in a storage device.

20. The method of claim 19 wherein the first relative relationship is a first one of a plurality of relative relationships, each of the plurality of relative relationships being between the first property of the first one of the first plurality of image regions and the first property of the second one of the plurality of image regions.

21. The method of claim 20 wherein the relative relationships correspond to relative spatial and photometric relationships between the first and second image regions.

22. The method of claim 21 further comprising the step of associating the relative relationships of the second image region with the first image region.

23. The method of claim 22 further comprising the steps of:
retrieving a digital image from a database; and
partitioning the digital image into a plurality of image regions.

* * * * *

UNITED STATES PATENT AND TRADEMARK OFFICE
CERTIFICATE OF CORRECTION

PATENT NO. : 5,963,670
DATED : October 5, 1999
INVENTOR(S) : Pamela R. Lipson, W. Eric L. Grimson, Pawan Sinha and Tomaso Poggio It is certified that error appears in the above-identified patent and that said Letters Patent is hereby corrected as shown below:

<u>Column 1,</u>
Line 8, "GOVERNMENT RIGHTS" after "Navy" insert -- and Grant Number ASC-9217041 awarded by the National Science Foundation --.

Signed and Sealed this

Fourteenth Day of January, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 5,963,670 | Page 1 of 1 |
| APPLICATION NO. | : 08/600378 | |
| DATED | : October 5, 1999 | |
| INVENTOR(S) | : Pamela R. Lipson et al. | |

It is certified that error appears in the above-identified patent and that said Letters Patent is hereby corrected as shown below:

In column one under the "Government Rights" section delete the entire paragraph and replace with --This invention was made with government support under grant numbers N00014-94-1-0994 and N00014-95-1-0600 awarded by the Navy, and grant number ASC9217041 awarded by the National Science Foundation. The government has certain rights in this invention.--

Signed and Sealed this
Thirty-first Day of May, 2011

David J. Kappos
*Director of the United States Patent and Trademark Office*